(12) United States Patent
Fitzgerald et al.

(10) Patent No.: US 8,636,567 B2
(45) Date of Patent: Jan. 28, 2014

(54) DAMPER TO CONTROL FLUID FLOW AND ASSOCIATED METHODS

(75) Inventors: Sean J. Fitzgerald, Indialantic, FL (US); John C. Farrar, Indialantic, FL (US); Robert F. Keimer, Melbourne Beach, FL (US); David L. Huie, Merritt Island, FL (US); Allen N. Williams, Palm Bay, FL (US); Matthew S. Ikemeier, St. Louis, MO (US); Brendan T. Fitzgerald, Indialantic, FL (US)

(73) Assignee: Airgonomix, LLC, Indialantic, FL (US)

( * ) Notice: Subject to any disclaimer, the term of this patent is extended or adjusted under 35 U.S.C. 154(b) by 1308 days.

(21) Appl. No.: 12/431,219

(22) Filed: Apr. 28, 2009

(65) Prior Publication Data
US 2009/0266903 A1    Oct. 29, 2009

Related U.S. Application Data

(60) Provisional application No. 61/048,607, filed on Apr. 29, 2008, provisional application No. 61/048,622, filed on Apr. 29, 2008, provisional application No. 61/161,221, filed on Mar. 18, 2009.

(51) Int. Cl.
*F24F 13/12*    (2006.01)
*F24F 11/04*    (2006.01)
*F16K 1/24*    (2006.01)

(52) U.S. Cl.
CPC ............... *F24F 13/12* (2013.01); *F24F 11/04* (2013.01); *F16K 1/24* (2013.01)
USPC ....... 454/333; 454/319; 454/334; 137/601.05

(58) Field of Classification Search
USPC .......... 454/318, 323, 324, 333, 334; 256/259; 137/601.05
See application file for complete search history.

(56) References Cited

U.S. PATENT DOCUMENTS

| 448,626 | A | * | 3/1891 | Bell | 137/601.05 |
|---|---|---|---|---|---|
| 917,300 | A | * | 4/1909 | Hughes | 137/499 |
| 4,231,513 | A | * | 11/1980 | Vance et al. | 236/49.5 |
| 4,599,081 | A | * | 7/1986 | Cohen | 623/2.34 |
| 4,931,948 | A | | 6/1990 | Parker et al. | |

(Continued)

FOREIGN PATENT DOCUMENTS

DE    3500641 A1 *   7/1986   ............ F24F 13/14

*Primary Examiner* — Steven B McAllister
*Assistant Examiner* — Frances H Kamps
(74) *Attorney, Agent, or Firm* — Mark R. Malek; Zies Widerman & Malek

(57) ABSTRACT

A damper for controlling fluid flow includes a main body, a stator and a rotor. The stator may be carried by the main body and include at least one blade having a predetermined shape. The rotor may be moveably connected to the stator and carried by the main body. The rotor may include at least one blade having a predetermined shape and may be moveable between an opened position and a closed position. The predetermined shape of the at least one stator blade and the at least one rotor blade may form a converging-diverging nozzle, and the stator and the rotor may be carried by the main body so that fluid flows through the main body substantially perpendicular thereto. The opened position may be defined as the at least one stator blade being aligned with the at least one rotor blade, and the closed position may be defined as the at least one stator blade being offset from the at least one rotor blade.

8 Claims, 14 Drawing Sheets

(56) References Cited

U.S. PATENT DOCUMENTS

| | | | |
|---|---|---|---|
| 5,366,149 A * | 11/1994 | Kline | 236/49.5 |
| 5,938,524 A | 8/1999 | Cunningham, Jr. | |
| 6,435,211 B2 | 8/2002 | Stone et al. | |
| 6,557,826 B2 | 5/2003 | Moore et al. | |
| 6,565,635 B2 * | 5/2003 | Keefer et al. | 96/125 |
| 6,817,378 B2 | 11/2004 | Zelczer | |
| 7,000,480 B2 * | 2/2006 | Kramer | 73/714 |
| RE40,503 E * | 9/2008 | Mohler | 335/272 |
| 7,540,266 B2 * | 6/2009 | Tsuzuki | 123/90.16 |
| 2004/0185769 A1 * | 9/2004 | Sung et al. | 454/187 |
| 2005/0208888 A1 * | 9/2005 | Moore et al. | 454/334 |
| 2006/0105697 A1 * | 5/2006 | Aronstam et al. | 454/256 |
| 2007/0178823 A1 * | 8/2007 | Aronstam et al. | 454/256 |
| 2008/0119127 A1 * | 5/2008 | Stewart | 454/256 |
| 2008/0292432 A1 * | 11/2008 | Castantini et al. | 414/217.1 |
| 2008/0303614 A1 * | 12/2008 | Fischer et al. | 333/261 |
| 2009/0035121 A1 * | 2/2009 | Watson et al. | 415/1 |
| 2009/0181611 A1 * | 7/2009 | Hollender et al. | 454/333 |
| 2010/0230113 A1 * | 9/2010 | Hutin et al. | 166/373 |

* cited by examiner

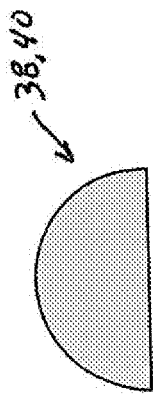
Fig. 19
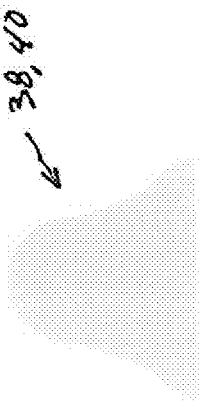
Fig. 21
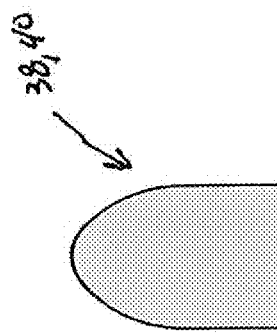
Fig. 18
Fig. 20

DAMPER TO CONTROL FLUID FLOW AND ASSOCIATED METHODS

RELATED APPLICATIONS

This application claims the benefit of U.S. Provisional Patent Application Ser. No. 61/048,607 filed on Apr. 29, 2008, and titled Intelligent HVAC System, and of U.S. Provisional Patent Application Ser. No. 61/048,622 filed on Apr. 29, 2008, and titled HVAC Damper Device, and of U.S. Provisional Patent Application Ser. No. 61/161,221 filed on Mar. 18, 2009, and titled Actuator for HVAC Damper Device and Associated Methods, the entire contents of each of which are incorporated herein by reference.

FIELD OF THE INVENTION

The present invention relates to the field dampers for controlling fluid flow and, more specifically, to the field of dampers that are operational to manually or automatically control fluid flow, as associated methods.

BACKGROUND OF THE INVENTION

Of the three major utility systems available in most buildings, specifically, lighting, plumbing, and heating, ventilation and air conditioning (HVAC), HVAC is the only system that is often not controlled at the individual or room level. For example, there are typically light switches in every room, not one master light switch that controls all of the lights in the building. Similarly, water faucets are typically controlled by individual users. In other words, users do not have to cause the water to run everywhere in the building when they want water in one location. Most traditional HVAC systems, however, have one thermostat that controls many rooms (these multiple rooms combine to form a single HVAC "zone"). Thus, one user often sets the thermostat to a temperature that every other occupant in the same HVAC zone has to accept.

In contrast, some modern HVAC systems allow for the control of temperature in individual rooms, offices or workspaces (each of which may be termed a "microzone"). This is generically accomplished by (1) providing a way to both monitor the actual temperature in each microzone and set the desired temperature for the microzone; (2) providing a way to control the flow of air into the microzone, often through the use of dampers that open or close to allow or prevent air flow; and (3) controlling the HVAC system so that it turns on or off as needed to provide either hot or cold air. It should be noted that modern HVAC systems are often installed as 'add-ons' to traditional HVAC systems in order to reduce incremental costs.

Many problems exist, however, with modern HVAC systems. For example, one issue that arises with existing HVAC systems is that an inherent conflict arises when multiple users control a single HVAC system. More particularly, if a user in one microzone wants the system to operate in heating mode, and another user wants the system to operate in cooling mode, a conflict arises between the users. Another issue that arises is that many traditional HVAC systems were not designed to allow for individual control by multiple users. These systems can inadvertently be harmed due to the choices made by individual users of modern HVAC systems. For example, if the vents are closed in a significant percentage of the microzones, the traditional HVAC system may suffer from significant back pressure, and not be able to push enough air over the heating or cooling elements to prevent damage to the system.

Yet another issue that arises with modern HVAC systems is that they are typically installed for one of two primary reasons—increased user comfort, or reduced energy costs. These two user goals are often in direct conflict. For example, to increase comfort, the system may need to be on more frequently than it otherwise would, and may need to rapidly alternate between heating and cooling modes which reduces efficiency. In contrast, if optimized to reduce energy costs, the modern HVAC system may not respond rapidly to individual user requests, significantly decreasing individual comfort compared to traditional HVAC systems.

It is often desirable to be able to prevent air from flowing through an HVAC duct. In fact, in modern HVAC systems it is often desirable for users in each room that is serviced by the HVAC system to have independent control over the flow of air into the room. This is accomplished through the insertion of a mechanical device commonly called a "damper" in the HVAC duct.

A damper is a mechanical device that can be moved between an opened position (allowing the flow of the air through the HVAC duct) to a closed position (preventing the flow of the air through the duct). Some dampers also allow intermediate positions, i.e., partially open or closed. This may allow a limited amount of airflow through the duct. In each case, existing dampers can be controlled directly or remotely, in either a manual or automated fashion.

The majority of dampers currently in use fall into one of the following general categories: butterfly valves, louvers or inflatable bladders. Butterfly valves are typically flat plates that are the same size and shape as the duct. The plate may be mounted on an axle that allows it to rotate around its center. When the plate is rotated so that it is aligned perpendicular to the flow of air, the damper is closed so that no air can pass. When the plate is rotated so it is parallel with the air stream, the damper is open and air flows past the plate with minimal resistance. Dampers that use a louver design have multiple plates that, together, are the same size and shape as the duct and each of which rotates around a separate axle in the center of the individual louver. To open or close the damper, the louvers are rotated around their individual axles. Dampers that use an inflatable bladder design contain flexible membranes that can be filled with air, or some other fluid, to expand the bladder so that it Blocks the flow of air through the duct. The membrane can then be opened to release the trapped air or other fluid, thereby reducing the size of the membrane and allowing the air in the HVAC duct to flow past the damper.

A louver type of HVAC damper is illustrated, for example, in U.S. Pat. No. 6,435,211 to Stone et al. An HVAC damper blade system is illustrated, for example, in U.S. Pat. No. 5,938,524 to Cunningham, Jr. A vane type of damper is illustrated, for example, in U.S. Pat. No. 6,817,378 to Zelczer. Each of these HVAC damper designs, as well as the other damper designs described above, suffers from various shortcomings. For example, the above referenced damper designs may suffer due to power requirements. It is often desirable to have dampers that can operate for long periods of time (multiple years) based on battery power. Damper designs such as butterfly valves and louvers that open in a plane that is parallel to the flow of air, and close in a plane that is perpendicular to the flow of air require significant amounts of energy to be moved between the opened and closed positions as they must overcome significant forces associated with moving air. Additionally, bladders that inflate to Block the air path, and then deflate to open the air path, require significant energy to inflate, especially in larger ducts.

Another problem that arises with such damper designs is noise generation. When opening or closing such dampers in either commercial or residential HVAC applications, it may be desirable to have the damper move between the opened and the closed positions in as quiet a manner as possible to avoid disturbing the building occupants. Implementations of the three above referenced damper designs may suffer from 'whistling' noises when changing being moved between the opened position and the closed position. This may be due to air flowing through a partially open damper during the period of time that it takes each of these three basic designs to open or close.

Yet another issue that arises with some of the above referenced damper designs may be excessive back pressure. Many dampers, even in the opened position, partially restrict the flow of air through the duct. If these dampers are installed in multiple ducts in the same HVAC system, the flow of air through the entire system can be affected, even when all dampers are open. This restriction can cause the flow of air to be limited to a level that is below the design level. When this occurs, compressor coils can freeze, and heating elements can overheat, causing major system malfunctions.

Still another issue that arises with the above referenced damper designs may be a space issues. Many HVAC systems are installed in tight spaces, such as, for example, drop ceilings, that do not have the physical space for large dampers. For example, a butterfly valve for a 14 inch duct must be 14 inches high in the open position. These space requirements often force installers to install dampers far upstream of the diffuser in order to accommodate space needs. Upstream installations of such dampers may be difficult, time consuming and costly.

Many dampers that are used in the HVAC industry must be manually opened and closed. This leads to inherent inefficiencies of the HVAC system. In other words, dampers that must be manually moved between opened and closed positions must rely on some intervention and, accordingly, cannot be efficiently used to respond to changes in room temperature. To account for this, some dampers have been powered to move between opened and closed positions, but require the use of AC power. This configuration greatly increases the cost of installation of electrically powered dampers. Accordingly, improvements to HVAC dampering systems are required.

SUMMARY OF THE INVENTION

With the foregoing in mind, it is therefore an object of the present invention to provide a damper to control fluid flow that greatly reduces, or eliminates, backpressure. It is also an object of the present invention to provide a damper that is readily installable, and that may be used with any size diameter fluid delivery system. It is further an object of the present invention to provide a damper that is selectively moveable between opened and closed positions responsive to a signal to control fluid flow. It is still further an object of the present invention to provide a damper that may be automated to move between the opened and closed positions. It is also an object of the present invention to provide a damper that has low power requirements to be moved between the opened and closed positions. It is further an object of the present invention to provide a damper that allows a user to remotely move the damper between opened and closed positions without having to access the damper.

These and other objects, features and advantages in accordance with the present invention are provided by a damper comprising a main body including sidewalls, a stator and a rotor. The stator is preferably carried by the main body and has at least one blade.

The rotor is preferably moveably connected to the stator and carried by the main body and includes at least one blade. Further, the rotor is moveable between an opened position and a closed position. The opened position of the rotor may be defined as the at least one stator blade aligned with the at least one rotor blade. The closed position may be defined as the at least one stator blade being positioned offset from the at least one rotor blade.

The main body preferably has a substantially cylindrical shape. Further, the stator may have a substantially cylindrical shape and the at least one stator blade may extend from a medial portion thereof to an inner peripheral portion of the main body. The rotor may have a substantially cylindrical shape and include a peripheral body portion. The at least one rotor blade may extend from a medial portion thereof to an inner portion of the peripheral body portion thereof.

The main body may have a first side defined as an entrance side and a second side opposite the first side defined as an exit side. The stator may be positioned adjacent the entrance side and the rotor may be positioned adjacent the exit side. Fluid flow through the main body may be directed into the entrance side of the main body, through the stator and rotor and out of the exit side of the main body. The rotor may be spaced apart from the stator when the fluid travels through the main body. This is one of several factors that advantageously allows the rotor to be moved between the opened position and the closed position with minimal power usage.

In a heating, ventilation and air conditioning (HVAC) application, the main body of the damper may be adapted to matingly engage duct work of the HVAC system so that the entrance side engages a portion of the duct work and the exit side engages a portion of the duct work. Alternately, the main body of the damper may be adapted to engage the duct work of the HVAC system and a diffuser of the HVAC system so that the entrance side engages the duct work and the exit side engages the diffuser. In another arrangement, the main body of the damper may be adapted to matingly engage a vent of the HVAC system so that the rotor is positioned adjacent the vent. These alternate embodiments advantageously allow the HVAC system to be readily used in several different applications, thereby providing an installer with greater flexibility to install the damper according to the present invention.

The rotor may be positioned in communication with a controller, and may be moveable between the opened position and the closed position responsive to a signal received by the controller. When the rotor is in the closed position, some airflow may pass through the main body. This advantageously minimizes problems associated with air in a serviced by the vent becoming stale when the damper is closed for a long period of time. This also minimizes, or eliminates condensation and advantageously enhances fresh air requirements that may be encountered, as well as minimizing dust buildup.

A method aspect of the present invention is for using a damper for a heating ventilation and air conditioning (HVAC) system. The method may include moving the rotor from the opened position to the closed position responsive to a signal received by the controller in communication with the rotor to minimize airflow through the damper. The method may also include moving the rotor from the closed position to the open position responsive to a signal received by the controller to maximize airflow through the damper.

BRIEF DESCRIPTION OF THE DRAWINGS

FIGS. 18-21 are schematic views of alternate embodiments of the stator blades and the rotor blades of the damper according to the present invention.

DETAILED DESCRIPTION OF THE PREFERRED EMBODIMENTS

Figure 1:
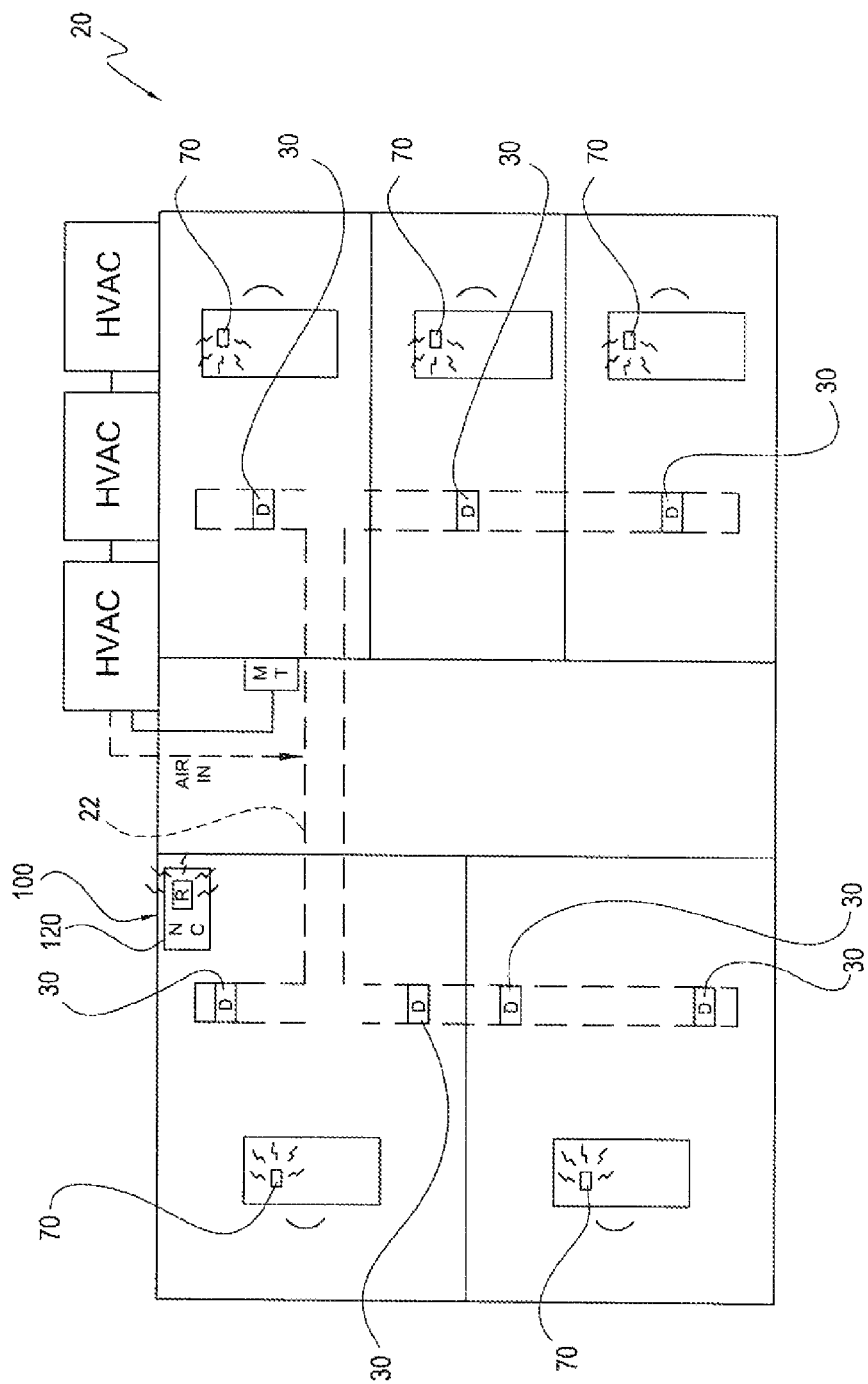
FIG. 1 is a schematic view of a commercial building having an HVAC system according to the present invention installed therein.
Figure 2:
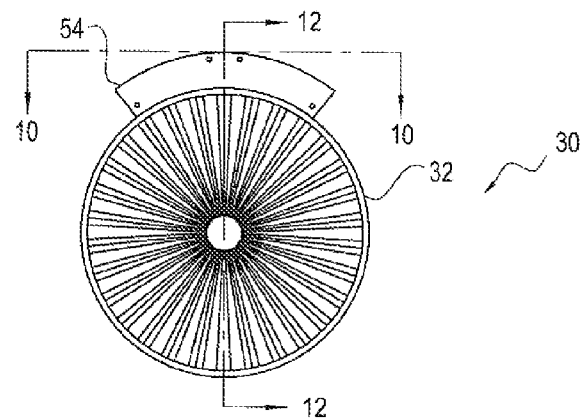
FIG. 2 is a front elevation view of a damper of an HVAC system according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now generally to FIGS. 1-21, an HVAC 20 system according to the present invention is now described in greater detail. More specifically, the HVAC system 20 as described herein addresses the problems described above through the use of a distributed command and control system that allows occupants of individual microzones to set a desired temperature for their space and have that temperature be automatically maintained by the system.

As will be described in greater detail below, the HVAC system 20 according to the present invention can broadly be described as having three components: (1) a damper 30, (2) an individual control unit or personal thermostat 70; and (3) a system controller 90. The vent unit, or damper 30, may be an electromechanical device that is easily installed in any desired vent/diffuser or within ductwork 22 of an HVAC system 20. The vent unit/damper 30 may be battery powered and preferably includes a wireless radio link and digital control logic. The vent unit can be remotely controlled by the personal thermostat 70 or system controller 90, via the wireless radio link so that it is open or closed (fully or partially) in order to control the flow of air into the microzone when the HVAC system 20 is turned on.

The damper 30 according to the present invention has several uses. More specifically, those skilled in the art will appreciate that the damper 30 according to the present invention is not limited to uses in the HVAC industry. Instead, the damper 30 according to the present invention may have several uses associated with controlling fluid flow through a fluid delivery system. In other words, the damper 30 according to the present invention may be used in several industries. For example, the damper 30 may be used to control water in water and wastewater treatment systems, power generation systems and other systems where water is passed through pipes. The damper 30 according to the present invention may also be used to control the flow of gases such as, for example, in a natural gas delivery system, chemical plants and other systems used to deliver gaseous material. Another example where the damper 30 according to the present invention may be used include oil refineries, water storage tanks, damns, irrigation systems, and any other fluid delivery system as understood by those skilled in the art. These systems are meant to be exemplary, and not meant to limit the scope of the invention, as understood by those skilled in the art.

Figure 11A:
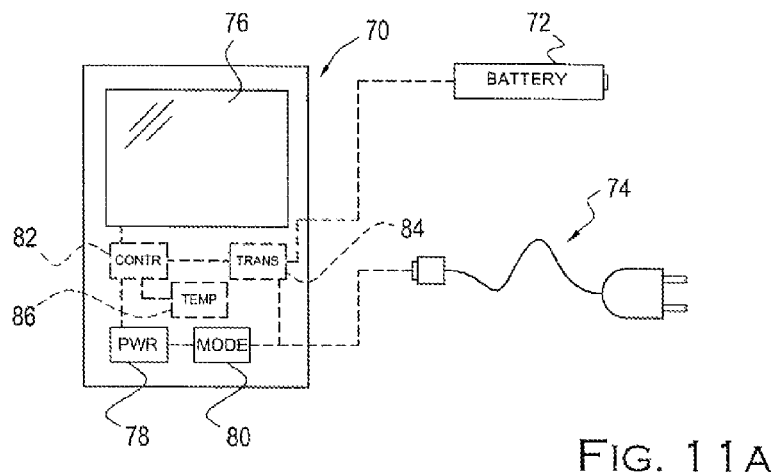
FIGS. 11A-11B are schematic views of remote control units for moving the rotor of the damper between the open and closed positions according to the present invention.
Figure 11B:
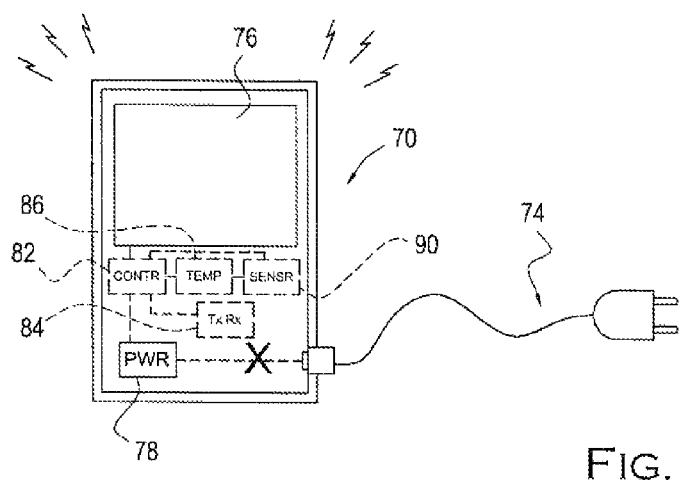
Figure 11C:
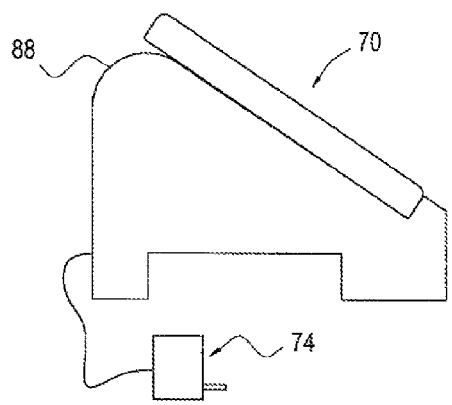
FIG. 11C is a side elevation view of the remote control units illustrated in FIGS. 11A-11B.

As perhaps best illustrated in FIGS. 11A-11C, the personal thermostat 70 advantageously monitors the ambient temperature in the microzone in which it is positioned and can allow a user to set a desired temperature in an individual microzone. The individual thermostat 70 may, for example, be provided by an individual remote control. As illustrated in FIG. 11A, the individual thermostat 70 may be battery powered 72 or may be plugged into a remote power source using, for example, an alternating current (AC) adapter 74. The individual thermostat 70 illustrated in FIG. 11B may include an internal power source, such as a battery 72 as well as the ability to connect to an external power source 74. In this version of the personal thermostat 70, however, using an external power source advantageously bypasses the internal power source 72 to thereby enhance the life of the internal power source 72. Those skilled in the art will appreciate that the internal power source, i.e., battery 72, may, for example, be rechargeable. This advantageously minimizes waste and enhances resource conservation.

The personal thermostat 70 may advantageously be fixed in place or portable. As illustrated in FIGS. 11A and 11B, the personal thermostat 70 may include a plurality of function buttons to be operated by the user. The function buttons may, for example, include a power button 78 and a mode selection button 80. Those skilled in the art will appreciate that although the illustrated embodiments show two buttons, the invention contemplates using more or less than two buttons, and is not intended to be limited to the use of buttons to access and use the various functions available to a user on the personal thermostat 70 according to the present invention.

For example, it is contemplated that the personal thermostat will include a display screen 76. The display screen 76 may, for example, be provided by a Liquid Crystal Display (LCD) screen. An LCD screen advantageously provides a bright viewing surface for a user. The display screen 76 may also be a touch screen to thereby advantageously incorporate control features of the personal thermostat, i.e., touch screen buttons to manually move the damper 30 between an opened position and a closed position, or mode button to switch the system between a manual mode, an automatic mode, or a semi-automatic mode, or a temperature control button to set a desired temperature in the microzone within which the personal thermostat 70 is positioned, or other buttons for other purposes, as understood by those skilled in the art.

Those skilled in the art will appreciate that the personal thermostat 70 includes a temperature sensor 86 carried by a housing 88 and in communication with a controller 82. The temperature sensor 86 advantageously monitors the temperature. The personal thermostat 70 may also include a transceiver 84 carried by the housing 88 and in communication with the controller 82. Accordingly, the temperature sensor 86 may transmit a command to the controller 82 which, in turn, may send a command to the transceiver 84 to transmit a signal to the damper 30 to move the rotor 40 of the damper between the opened and closed position. In other words, and as will be discussed in much greater detail below, the rotor 40 of the damper 30 may be moveable between the opened and the closed positions responsive to a signal received from the personal thermostat 70.

As will be discussed in greater detail below, at least one algorithm may be used to operate the HVAC system. Those skilled in the art will appreciate that a desired temperature set by a user will not always be able to be accommodated. As such, the algorithm to be used may incorporate a weighting system to accommodate certain microzones. Further, the algorithm may be used to advantageously manage a balance between temperature control for user comfort and temperature control for energy conservation. The algorithm may, for example, be a program that may be stored on a computer readable medium, or may be saved on a computer memory to be accessed and/or downloaded via a global communications network.

The transceiver 84 may be used to communicate with other components of the HVAC system 30. Further, the transceiver may, for example, be provided by a wireless radio link or other communication method, as understood by those skilled in the art. In the preferred embodiment, the personal thermostat 70 includes a wireless radio link, digital control logic and a temperature sensor.

The personal thermostat 70 may also advantageously include a motion sensor 90 or other type of occupancy sensor to enable the device to determine if the microzone is occupied at any given time. The motion sensor 90 is illustratively positioned in communication with the controller 82 and advantageously enhances energy efficiency of the HVAC system. Those skilled in the art will appreciate that the personal thermostat 70 may be programmed to a predetermined temperature upon a detection of no occupancy in a particular microzone.

This detection may be premised on several factors. For example, the determination that a microzone is not occupied may be determined based on the motion sensor not sensing motion for a predetermined amount of time. This may also be determined by measuring the amount of time since at least one of the control features, i.e., the touch screen LCD display 76 or one of the power or mode buttons 78, 80, have been engaged. Those skilled in the art will appreciate that such a determination may be customizable so that a user of the personal thermostat 70 may advantageously set their own predetermined time before the personal thermostat sends a signal to change the temperature in the microzone to the predetermined temperature.

The present invention also contemplates that a personal computer or other existing electronic device may be modified to perform the functions of the personal thermostat 70. Regardless of the medium of the personal thermostat 70, the purpose of the personal thermostat is to gather inputs relating to actual temperature, desired temperature and other characteristics of the microzone (e.g. occupancy, etc.) and either directly control the damper 30 to open or close based on the various data points. Alternately, the personal thermostat 70 may relay the data to a system controller 100 so that the system controller can function as described below.

The system controller 100 may include software that runs on a computer or other digital control device. The system controller interfaces with vent units, personal thermostats and the existing HVAC system to collect and process data related to actual temperature, desired temperature, occupancy and possibly other metrics in each microzone in the system. Using software programmable command and control algorithms, the system controller opens and closes individual vent units and turns the HVAC system on and off (in either heating, cooling or 'fan-only' mode) to control the temperature in each microzone. The system controller also has provisions for multiple user inputs and settings related to the installation, setup and system monitoring/maintenance of the intelligent HVAC system.

The system controller 100 may also interface with the building's existing energy management system (EMS) to control and/or monitor additional functions such as the amount of outside (fresh) air being circulated through the building based on the actual occupancy level of each microzone, the temperature of the air being provided by the HVAC system and the status of bypass ducts and dampers that are part of the existing HVAC system. The system controller 100 may include software that runs on a computer/server 120 or other digital control device. The system controller 100 may interface with vent units/dampers 30, personal thermostats 70 and the existing HVAC system to collect and process data related to actual temperature, desired temperature, occupancy and possibly other metrics in each microzone. Using software programmable command and control algorithms, the system controller 100 may open and close individual vent units, i.e., a rotor 36 of a damper 30, and may also turn the HVAC system 20 on and off (in either heating, cooling or 'fan-only' mode) to control the temperature in each microzone. The system controller 100 may also have provisions for multiple user inputs and settings related to the installation, setup and system monitoring/maintenance of the HVAC system. The system may also allow for reporting capabilities and may also have the ability to interface with utilities information to adjust temperatures during peak load times. This advantageously may provide a user with lower rates associated with powering the system.

The HVAC system of the present invention also contemplates interfacing the system controller 100 with the building's existing energy management system (EMS) to control and/or monitor additional functions such as the amount of outside (fresh) air being circulated through the building based on the actual occupancy level of each microzone, the temperature of the air being provided by the HVAC system 20 and the status of bypass ducts and dampers that are part of the existing HVAC system.

The system controller 100 may include a wireless transceiver connected thereto to wirelessly receive signals from personal thermostats 70 positioned in each microzone. Further, the system controller 100 is also positioned in communication with the existing HVAC system in the structure to allow for control of the HVAC system, i.e., allow the HVAC system to be turned on and off and to allow for the system controller to control individual dampers 30 in each of the microzones. More specifically, the HVAC system 20 may include a master thermostat controller 102 in communication with the system controller 100 so that the HVAC system may be controlled by the system controller. Those skilled in the art will appreciate that any type of wireless communication link may be established between the system controller 100 and the personal thermostats 70. Preferable wireless communications links may, for example, include wireless radio links such as, for example, Zigbee (802.15.4), Z-Wave, Wi-Fi, Bluetooth and cellular (2G, 3G, 4G, etc.) or any other similar low power radio frequency link, as understood by those skilled in the art.

The system controller 100 may advantageously be placed on site at the structure where the dampers 30 and HVAC system exist. Alternately, however, the system controller may also be positioned off site and remotely operated via a global communications network, i.e., the Internet. This advantageously allows an administrator, for example, to readily control the HVAC system 20 and to also monitor usage of the HVAC system. This may be advantageous when data points from a first location may be needed for comparison to data points at a different location.

Referring now more specifically to FIGS. 2-5, a damper 30 for use in an HVAC system 20 according to the present invention is now described in greater detail. The damper 30 for the HVAC system 20 according to the present invention illustratively includes a main body 32, and a stator 34 carried by the main body. More specifically, the stator 34 is preferably integrally formed with the main body 32. The stator 34 also illustratively includes a plurality of blades 38. Each of the plurality of blades 38 preferably has a substantially triangular shape. The main body 32, the stator 34, and the blades of the stator 38 are preferably integrally formed as a monolithic unit. Those skilled in the art will appreciate that the main body 32, stator 34 and blades of the stator 38 may be injection molded, but the present invention advantageously contemplates any other form of manufacture. Those skilled in the art will also appreciate that the main body 32 and the stator 34 do not necessarily need to be integrally formed. More specifically, the present invention contemplates that the main body 32 and the stator 34 may be separate items that are readily connectible. The connection between the main body 32 and the stator 34 may be any connection suitable for maintaining the stator 34 in place with respect to the main body, as understood by those skilled in the art.

Figure 3:
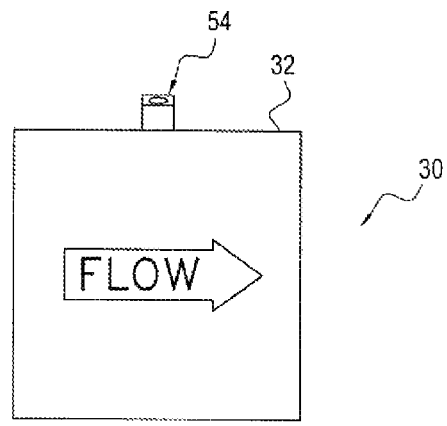
FIG. 3 is a side elevation view of the damper illustrated in FIG. 2 having a longer main body.
Figure 4:
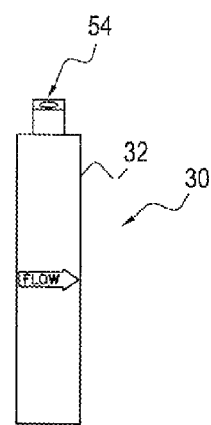
FIG. 4 is a side elevation view of the damper illustrated in FIG. 2 having a shorter main body.

As illustrated in FIGS. 3 and 4, the sidewalls of the main body 32 of the damper 30 may have varying widths. The version of the damper 30 illustrated in FIG. 3 is advantageous during the installation process as it may be easier to connect the ends of the main body 32 of the damper to the ductwork 22 of the HVAC system. The version of the damper 30 illustrated in FIG. 4, however, is also advantageous as it requires less material to be constructed and, as such, is more environmentally friendly. Those skilled in the art will appreciate that the main body 32 of the damper 30 may have any number of widths and still accomplish the goals, features and objectives of the present invention. The main body 32, stator 34 and rotor 36 of the damper 30 may be made of a composite material, for example, or any other similar material having high strength, high durability and lightweight properties. It is preferable, however, that the main body 32, stator 34 and rotor 36 of the damper 30 be made of a low friction material so that when the rotor rotatably moves adjacent the stator, less friction is encountered, thereby necessitating less power to move the rotor between the opened position and the closed position.

The damper 30 may also include a rotor 36 that is movably connected to the stator 34. The rotor 36 is preferably mounted on a fixed axle that is concentric with the stator 34. The rotor 36 is thus able to spin around the fixed axle. More specifically, the rotor 36 is preferably rotatably connected to the stator 34 using a connector pin 46. The connection between the rotor 36 and the stator 34 using the connector pin 46 is illustrated, for example, in FIG. 12A. When the rotor 36 is movably connected to the stator 34, it is illustratively carried by the main body 32 of the damper 30.

Figure 12A:
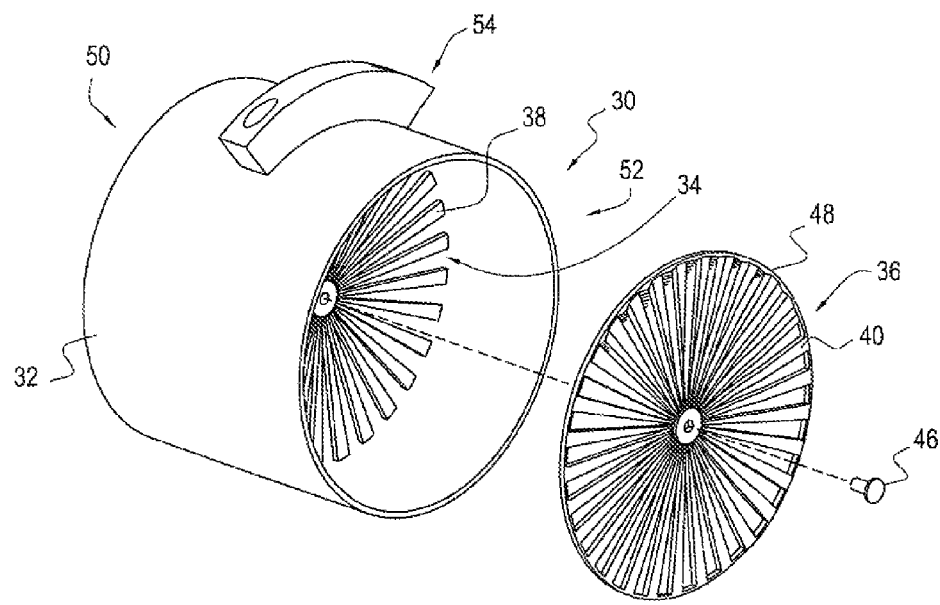
FIG. 12A is an exploded perspective view of a damper according to the present invention.
Figure 12B:
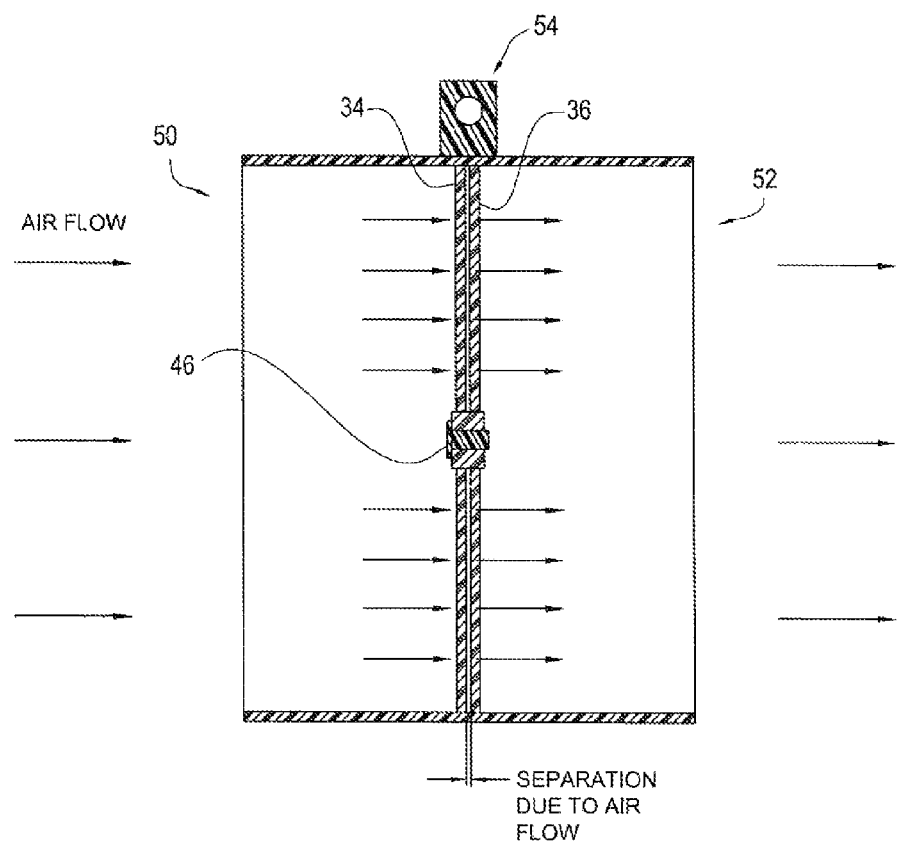
FIG. 12B is a sectional view of the damper illustrated in FIG. 2 and taken through line 12-12.

Although use of a connector pin 46 is illustrated in FIG. 12A, those skilled in the art will appreciate that any other connection may be made between the stator 34 and the rotor 36. More particularly, medial portions of the stator 34 and the rotor 36 may be connected using snap connections that use bearings to allow for rotation therebetween. Those skilled in the art will also appreciate that the connection between the stator 34 and the rotor 36 may be positioned anywhere along the stator and rotor. In other words, the connection between the stator 34 and the rotor 36 is not limited to the medial portions thereof. Instead, the connection between the stator 34 and the rotor 36 may, for example, be adjacent outer peripheral portions thereof. Accordingly, the damper 30 according to the present invention advantageously contemplates any connection between the stator 34 and the rotor 36. When the rotor 36 is movably connected to the stator 34, it is illustratively carried by the main body 32 of the damper 30.

The rotor 36 also includes a plurality of blades 40, each of which preferably have a triangular shape. As mentioned above, however, the rotor blades 40 may also have other shapes such as, for example, an arcuate shape, e.g., semicircular, parabolic, etc. A medial portion of the rotor 36 may have a connector pin receiving passageway for receiving the connector pin 46 to rotatably connect the rotor to the stator 34. The rotor 36 may include a peripheral body portion 48 forming a sidewall thereof. The main body 32, the stator 34 and the rotor 36 are preferably cylindrically shaped. Accordingly, the peripheral body portion 48 forms the outer sidewall of the cylindrically shaped rotor 36. The diameter of the peripheral body portion 48 of the rotor 36 is illustratively slightly smaller than the diameter of an inner peripheral portion of the cylindrically shaped main body 32. Accordingly, the rotor 36 may rotate adjacent the stator 34 when positioned to be carried by the main body 32.

Similar to the rotor 36, the stator 34 also includes a connector pin receiving passageway formed through a medial portion thereof. The blades 38 of the stator 34 illustratively extend from the medial portion of the stator adjacent the connector pin receiving passageway to an inner peripheral portion of the main body 32. Similarly, the blades 40 of the rotor 36 extend outwardly from a medial portion of the rotor adjacent the connector pin receiving passageway to the inner portion of the peripheral body portion 48 of the rotor.

When the rotor 36 is rotatably connected to the stator 34, the base 42 of each of the blades 38 of the stator are preferably positioned to face the base 44 of each of the blades 40 of the rotor 36. The rotor 36 is movable between an opened position and a closed position and, more specifically, the rotor is rotatably movable between the open position and the closed position. The open position of the rotor is defined as the base 42 of each of the blades 38 of the stator 34 being aligned with the base 44 of each of the blades 40 of the rotor 36. The closed position of the rotor 36 is defined as the base 42 of each of the blades 38 of the stator 34 being offset from the base 44 of each of the blades 40 of the rotor. Both the stator 34 and the rotor 36 may include several blades 38, 40 positioned to extend from the medial portions thereof outwardly. The blades 38, 40 may be spaced between about 2 degrees and 10 degrees apart. Those skilled in the art will appreciate that this spacing is not meant to be limiting, and that the present invention contemplates that the stator blades 38 and the rotor blades 40 may have any desired spacing.

The present invention contemplates the use of stator blades 38 and rotor blades 40 that have many other shapes. For example, and with reference to FIGS. 18-21, the stator blades 38 and the rotor blades 40 may have a substantially arcuate shape. With reference, for example, to FIG. 18, the arcuate shape of the stator blades 38 and the rotor blades 40 may have an arcuate end, i.e., a semi-circular end, and be somewhat elongated. With reference, for example, to FIG. 19, the arcuate shape of the stator blades 38 and the rotor blades 40 may be provided by a semi-circular shaped blade. With further reference, for example, to FIG. 20, the shape of the stator blades 38 and the rotor blades 40 may be provided having an arcuate bottom portion. With still further reference, for example, to FIG. 21, the shape of the stator blades 38 and the rotor blades 40 may be provided by a parabolic shaped blade.

Those skilled in the art will appreciate that the stator blades 38 and the rotor blades 40 may have any other shaped blade that allows the damper 30 of the present invention to be installed into the HVAC system 20 and significantly limit backpressure when the rotor 36 is in the opened position, and also allows for a significant amount of the airflow to still travel through the main body 30 when the rotor is in the opened position. More particularly, those skilled in the art will appreciate that installation of the damper 30 according to the present invention will inherently block a portion of the passageway through which airflow passes in the HVAC system 20. The damper 30 according to the present invention, however, advantageously provides slight, or no, loss of fluid flow through the main body thereof when the rotor 36 is in the opened position. As will be discussed in greater detail below, the combination of the stator blades 38 and the rotor blades 40 form an advantageous converging-diverging nozzle design.

Although a stator 34 and a rotor 36 are depicted in the appended drawings, those skilled in the art will appreciate that the damper 30 may be formed using any structure that allows for the use of blades to control the flow of fluid. For example, the stator 34 may be considered a first bladed assembly supported by an axis that includes a plurality of blades. Similarly, the rotor 36 may be considered a second bladed assembly moveable relative to the first bladed assembly and supported by a support axis. The second bladed assembly may include a plurality of blades and may be moveable between an opened position and a closed position. Accordingly, although the damper 30 of the present invention includes the use of a stator 34 and a rotor 36 to control fluid flow, those skilled in the art will appreciate that any bladed assemblies may be used to achieve the goals, features, objectives and advantages of the present invention.

The main body 32 of the damper 30 illustratively includes two open sides. The first side is defined as an entrance side 50 of the damper 30 and the second side, opposite the first side, is defined as an exit side 52 of the damper. The entrance side 30 and exit side 32 refers to the entrance of airflow into and the exit of airflow out of the damper 30. The stator 34 is preferably positioned adjacent the entrance side 50 of the damper 30 and the rotor 36 is rotatably connected to the stator adjacent the exit side 52 of the damper. Accordingly, when the damper 30 is installed, airflow through the main body 32 is directed into the entrance side 50, through the stator 34 and the rotor 36 and out through the exit side 52 of the damper.

When airflow is directed through the main body 32 of the damper 30 as described above, the rotor 36 may be spaced apart from the stator 34 to form an air bearing. More specifically, the connector pin 46 that rotatably connects the rotor 36 to the stator 34 is advantageously low in friction and allows the rotor to move laterally normal to the plane of rotation of the rotor. The space between the rotor 36 and the stator 34 when the airflow is moving through the main body 32 of the damper 30 is slight, but allows the rotor to move with very little effort, thereby necessitating very little power.

The configuration of the stator 34 and the rotor 36 also advantageously greatly reduces dust buildup on the stator blades 38 and the rotor blades 40, as well as throughout the main body 32 of the damper 30 according to the present invention. More particularly, when the rotor 36 is in the opened position, dust that may have build up on the stator blades 38 and the rotor blades 40 may advantageously be blown away, thereby making the damper 30 of the present invention a self cleaning damper. Those skilled in the art will appreciate that the self cleaning damper 30 according to the present invention advantageously enhances air quality in the system and also decreases maintenance issues that may arise due to dust, or other contaminant, build up within the system.

As illustrated, for example, in FIG. 6, and as will be described in greater detail below, the HVAC system also includes an actuator 54 carried by the main body 32 of the damper 30. The actuator 54 includes a pair of opposing electromagnets 56 that may be selectively energized by a power source 58 in communication with the actuator. The power source 58 may, for example, be a battery, but those skilled in the art will appreciate that the actuator 54 may be hard wired to an electrical system within the structure where the HVAC system 20 is installed. The power source 58 is preferred, however, to be a battery. The damper 30 design according to the present invention above advantageously allows for use of a battery as the power source 58 while simultaneously providing a system that uses a decreased amount of energy to energize the electromagnets 56 and allow for the actuator 54 to selectively move the rotor 36 between the opened position and the closed position. Additional details regarding the actuator 54 and the use of electromagnets 56 to move the rotor 36 between the opened position and the closed position are provided below.

Figure 5:
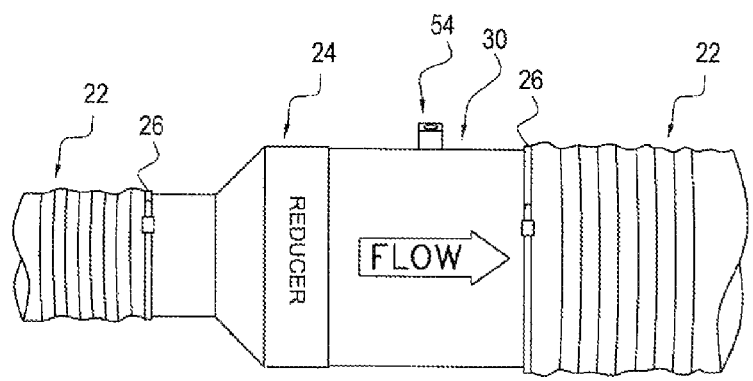
FIG. 5 is a side prospective view of the damper illustrated in FIG. 2 being connected to ductwork of an HVAC system using a reducer.

As perhaps best illustrated in FIG. 5, the damper 30 of the present invention may advantageously be connected to the ductwork 22 of an existing HVAC system 20. At its perimeter, mechanical attachment points are provided that allow the damper 30 to be easily and quickly connected to an existing HVAC duct via screws, rivets or other mechanical means. Those skilled in the art will appreciate that in some instances ductwork 22 having various diameters may be installed in an existing HVAC system. HVAC systems may, for example, include flexible ductwork 22 ranging in size from 6 inches to 14 inches, with the majority being between 8 inches and 12 inches. In such a case, the damper 30 may be connected to a reducer 24 so that the damper may be readily connected to the ductwork 22. As illustrated in FIG. 5, the damper 30 may engage the ductwork 22 so that both the entrance side 50 and the exit side 52 thereof may engage the ductwork.

Figure 7:
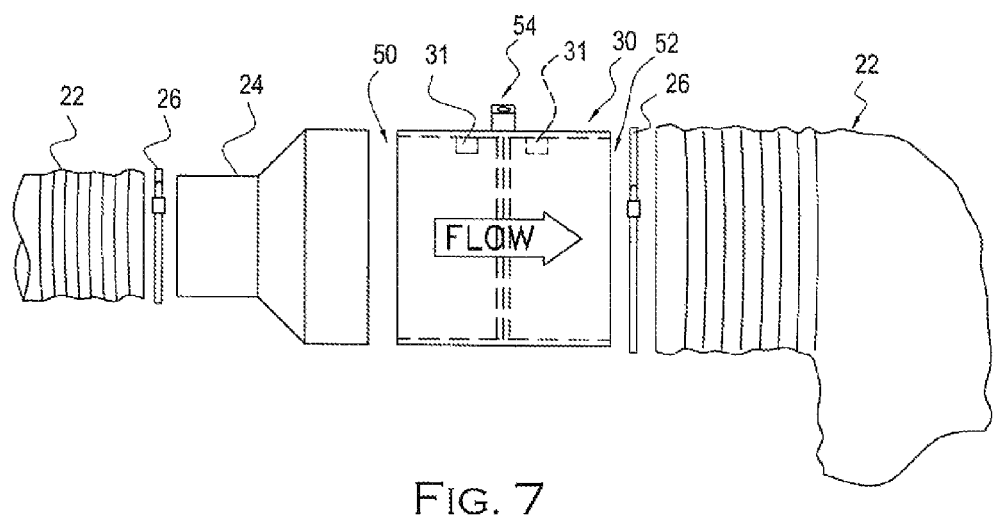
FIG. 7 is an exploded partial side perspective view of the damper illustrated in FIG. 2 being connected between ducts using a reducer.

As illustrated in FIG. 7, a connector 26 may be used to connect the damper 30 to the ductwork 22. The connector 26 may be provided by a compressible gasket, a clamp or a zip tie, or even tape, for example. Those skilled in the art will appreciate that any connector 26 suitable for connecting the damper 30 to the ductwork 22 so that a substantially airtight seal is formed between the damper and the ductwork may be used. An airtight connection is preferable to minimize and/or eliminate air loss at the connection point between the damper 30 and the ductwork 22. More specifically, the ductwork 22 is preferably positioned to surround both the entrance side 50 and the exit side 52 of the damper 30. This advantageously simplifies installation of the damper 30 and also minimizes, or eliminates, any airflow loss through the ductwork 22 when the damper is installed.

Figure 6:
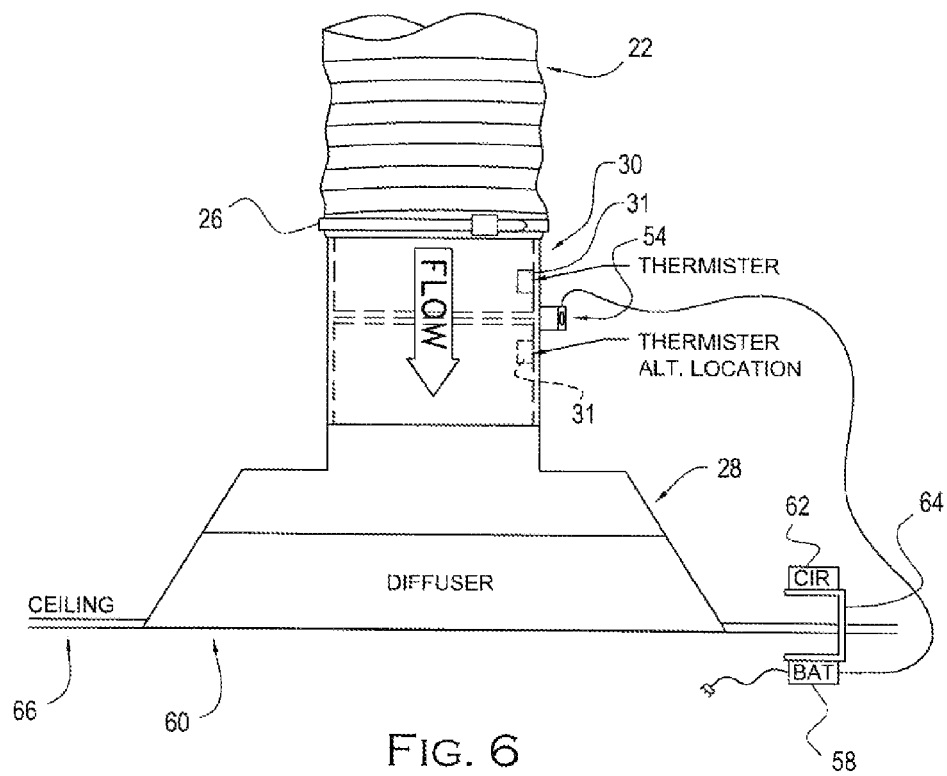
FIG. 6 is a partial side perspective view of the damper illustrated in FIG. 2 being connected between a diffuser and duct work of an HVAC system and showing a power source and controller connected to an actuator thereof.

As illustrated in FIG. 6, the damper 30 may also be connected between the ductwork 22 of an HVAC system 20 and a diffuser 28. This configuration also advantageously allows for simplified installation of the damper 30. When the damper 30 is installed adjacent a diffuser 28 of an HVAC system 20, the entrance side 50 of the damper preferably engages the ductwork 22 and the exit side 52 of the damper preferably engages a portion of the diffuser.

Figure 8A:
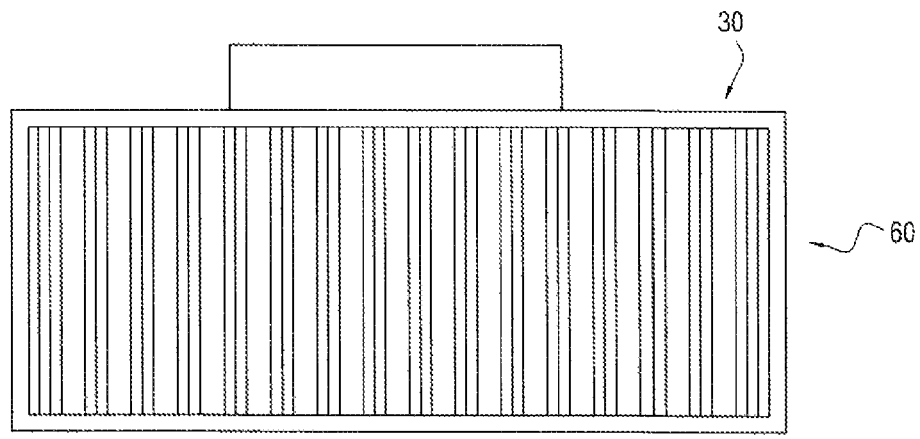
FIG. 8A is a front elevation view of a damper according to the present invention having a rectangular shape.
Figure 8B:
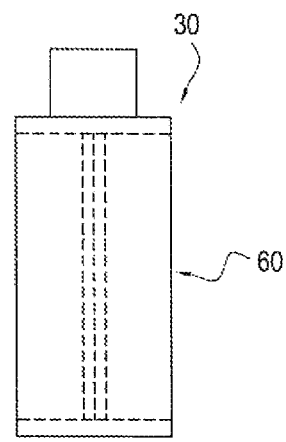
FIG. 8B is a side elevation view of the damper illustrated in FIG. 8A.

Referring now additionally to FIGS. 8A and 8B, another configuration of the damper 30 according to the present invention is now described in greater detail. The damper 30 illustrated in FIGS. 8A and 8B has a substantially rectangular shape, and may be adapted to engage a vent 60 of an HVAC system 20. When the damper 30 is positioned to engage a vent 60 of the HVAC system 20, the rotor 36, i.e., the exit side 52 of the damper, is preferably positioned adjacent the vent 60. Those skilled in the art will appreciate that the damper 30 may be incorporated into the vent 60. Accordingly, such installation is also simplified as it only requires replacing an existing vent with a vent 60 that has the damper 30 according to the present invention incorporated therein.

Those skilled in the art will appreciate that the damper 30 according to the present invention may have any shape and still accomplish the goals, features and objectives of the present invention. More specifically, the damper 30 according to the present invention, having blades 38, 40 associated therewith that allow for a converging-diverging effect to thereby allow for a significant amount of fluid to pass through the main body 32 thereof, while simultaneously providing minimal, if any, back pressure, may have any shape, i.e., cylindrical, rectangular, polygonal, arcuate, triangular, etc., as understood by those skilled in the art.

Figure 9A:
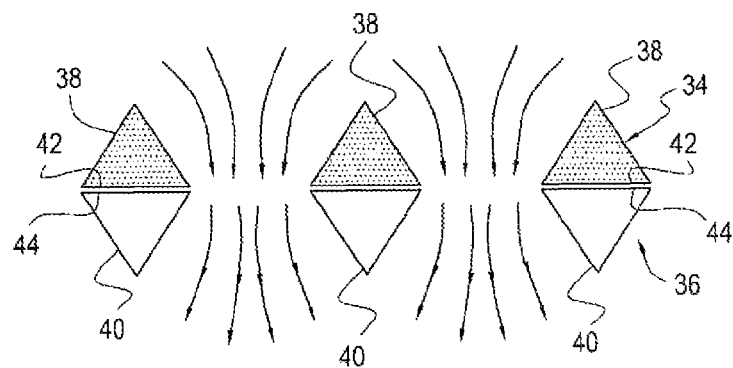
FIGS. 9A-9C are schematic views of a rotor of a damper according to the present invention being moved between the opened position (FIG. 9A), a semi-closed position (FIG. 9B) and a closed position (FIG. 9C).
Figure 9B:
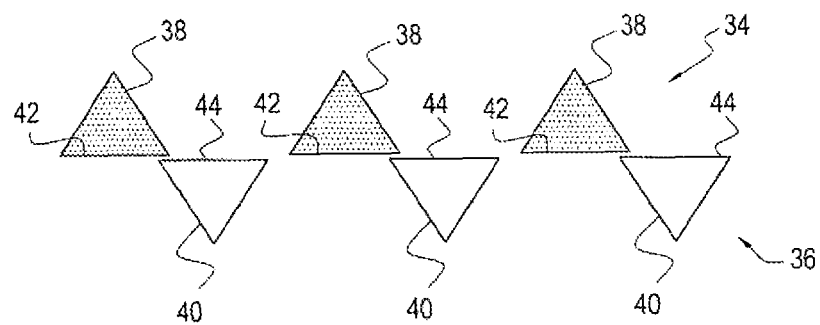
Figure 9C:
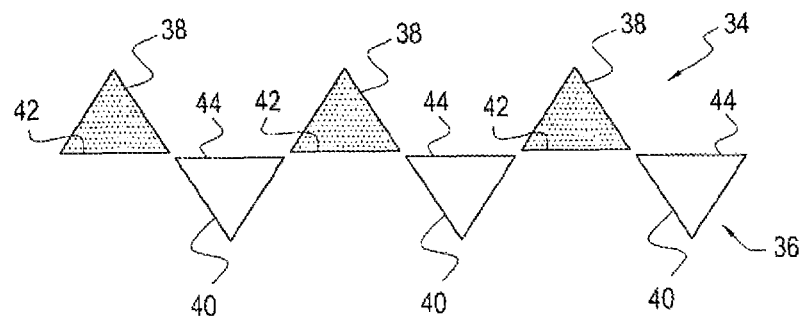

Referring now additionally to FIGS. 9A-9C, various positions of the rotor 36 of the damper 30 according to the present invention are now described in greater detail. FIG. 9A depicts the rotor 36 being positioned in the opened position. The bases 44 of the triangular shaped blades 38, 40 of both the rotor 36 and the stator 34 are illustratively aligned with one another. As discussed above, the medial portion of the main body 32 is preferably formed in a circular pattern, with a 'hub and spoke' design, i.e., the hub being provided by the connector pin receiving passageway and the spokes being provided by the blades 38, 40 of both the stator 34 and the rotor 36. When viewed from the end of the spoke, each of the spokes, i.e., blades 38, 40 in the design is shaped in a manner to optimize the flow of air past the blade.

This arrangement advantageously provides a converging-diverging arrangement through which airflow passes over the rotor 40 and stator 38. In other words, as the airflow passes through the main body 32 of the damper 30, it passes over the triangular shape of the blades 38, 40 of both the rotor 36 and stator 34, which are aligned in the opened position, to advantageously allow the volume of air flowing through the damper to be maintained. This advantageously greatly decreases, and usually eliminates, backpressure in the HVAC system 20. Those skilled in the art will appreciate that eliminating back pressure in the HVAC system 20 advantageously increases the life of the HVAC components.

When the rotor 36 is open, the blades 38, 40 of the stator 34 and rotor combine to form a converging-diverging (CD) nozzle. When the CD nozzle is formed, it allows the fluid to flow smoothly through the damper 30 and, in fact, may accelerate the fluid as it passes through the damper in order to eliminate any increase in pressure upstream of the damper. This elimination of back pressure is a unique design feature that enables the damper 30 according to the present invention to avoid system level problems caused by partially blocking fluid delivery systems, e.g., pipes, HVAC ducts, or any other fluid delivery system as understood by those skilled in the art. The CD nozzle design also has the benefit of providing quiet operation as the fluid flowing through the damper 30 when the rotor 36 is in the open position has laminar flow characteristics, causing it to be very quiet compared to the turbulent fluid flow over many other damper designs. In addition, the short range of travel required for the rotor 36 to travel between the open position and the closed position allows the rotor to transition quickly before turbulent fluid flow conditions can occur causing noise, or other problems, during the transition period.

In one implementation of the damper 30, the rotor 36 may be driven by a mechanical device such as a rotational solenoid or servo motor that turns the rotor through a predetermined angle that causes the rotor blades 40 to either align or be offset from the stator blades 42, thereby opening or closing the damper. Alternately, the rotor blades 42 can be shaped to allow them to be turned by air flowing through the damper 30 and the rotor 36 can be latched in the open or closed position through the use of a linear solenoid or similar device. In yet another implementation, energy may be captured from the moving airstream in the HVAC duct using devices such as turbines, and stored in electrical, chemical, mechanical or other form. This stored energy may then released as/when need to open or close the damper. Finally, combinations of the above implementations may be used in a single implementation. Those skilled in the art will recognize that the CD nozzle concept disclosed herein can be implemented in other types of damper designs including, louvers, for example, and other types of damper designs. The subject invention is not limited to the rotary damper described herein, but rather it can be applied in a variety of configurations and design implementations.

FIG. 9B depicts the rotor 36 of the damper 30 being moved to the closed position. Those skilled in the art will appreciate that it is preferable that when the rotor 36 is positioned in the closed position, the bases 42, 44 of the blades 38, 40 of both the stator 36 and the rotor 38 are offset from one another so that a space is present between the blades of the stator and rotor to allow some portion of the air volume to pass therethrough. More specifically, it is preferable that between less than about 25% of the airflow volume passes through the main body 32 of the damper 30 when the rotor 36 is in the closed position. Those skilled in the art will appreciate that any range of volume may be allowed to pass through the main body 32 of the damper 30 when the rotor 36 is in the closed position. This advantageously greatly decreases back pressure on the HVAC system 20. Those skilled in the art will appreciate that the arrangement illustrated in FIG. 9B also advantageously maintains airflow through the damper 30 to eliminate condensation, meets fresh air requirements, and minimizes dust particle entrapment.

As also discussed above, the illustrated shape of the stator blades 38 and the rotor blades 40 advantageously allow the damper 30 of the present invention to be self cleaning, or self flushing, due to increased fluid flow velocity over the blade surfaces when transitioning to the open position, as well as increased fluid flow velocity over the blade surfaces when the rotor 36 is maintained in the open position. Other components of the damper 30, i.e., the inner diameter spindle forming the pin receiving passageway, are also 'self cleaning due to rotational wiping action between the pin receiving passageway formed in the stator 34 and the pin receiving passageway formed in the rotor 36.

As illustrated in FIG. 9C, there are instances when it is preferable airflow volume is completely prevented from passing through the damper 30. In such a case, the blades 38, 40 of the stator 34 and the rotor 36 may be positioned in such a manner as to Block airflow volume from passing through the main body 32 of the damper.

Referring now additionally to FIG. 6, control aspects of the damper 30 according to the present invention are now described in greater detail. More specifically, the actuator 54 carried by the main body 32 of the damper 30 and being positioned in communication with the rotor 36 is illustratively positioned in communication with a controller 62 and a power source 58. The controller 62 may be provided by a printed circuit board, for example, but those skilled in the art will appreciate that any similar controller suitable for processing a signal and energizing the electromagnets 56 of the actuator 54 to move the rotor 36 between opened and closed positions is suitable.

In the embodiment illustrated in FIG. 6, the controller 62 and a power source 58 are carried by a clamp 64 adjacent a ceiling 66 of a structure, in close proximity to a diffuser 28 of the HVAC system 20. In a commercial application, the ceiling 66 is generally provided by a typical acoustical tile ceiling including a grid system and a plurality of acoustical tiles. As such, the controller 62 and power source 58 may be carried by the clamp 64 or bracket, for example, and carried adjacent the grid system of the acoustical tile ceiling. This advantageously allows the damper 30 to be readily installed without major visibility of any of the components of the HVAC system 20 according to the present invention.

The system illustrated in FIG. 6 depicts the controller 62 and power source 58 being carried by a clamp 64 or bracket adjacent the diffuser 28 in the ceiling 66. The HVAC system 20 according to the present invention contemplates that the controller 62 and power source 58 may have alternate locations as well. For example, the controller 62 and power source 58 may also be carried by the main body 32 of the damper 30 adjacent the actuator 54. Further, the controller 62 and the power source 58 may be positioned above the ceiling 66, but spaced apart from the damper 30. The controller 62 may also be configured from a centralized power distribution source such as, for example, a panel transformer, or outlet. The controller 62 may further be mounted as a part of the vent assembly of the HVAC system 20 with or without a collocated power source. In other words, power may, for example, be provided from a battery or from a central power source serving many controllers.

The controller 62 includes a transceiver (not shown) connected thereto and positioned in communication with both the power source 58 and the actuator 54. The power source 58 is also positioned in communication with the actuator 54 to energize the electromagnets 56 to move the actuator, thereby causing the rotor 36 to be selectively moved between the opened and closed positions. The transceiver is adapted to receive a signal from the personal thermostat 70, or from the system controller 100, to cause the rotor 36 to be moved between the opened and closed positions. A temperature sensor 31 may be carried by an internal portion of the damper 30 to measure the temperature of the airflow through the damper. The temperature sensor 31 is positioned in communication with the controller 62 and may be positioned either upstream or downstream of the stator 34 and the rotor 36.

The low power requirements to move the rotor 36 between the opened and closed positions, allow for the power source 58 to be provided by a battery, for example. The battery may advantageously have a long life as very little power is needed to energize each of the electromagnets 56 to cause the rotor 36 to be moved between the opened and the closed positions. Alternately, however, the power source 58 may be provided by direct access to the structure's electrical system. Some users may find such a configuration to be preferable, depending on the type of structure where the HVAC system 20 will be installed. Accordingly, and as illustrated, the power source 58 may advantageously include a combination of a battery power source, and wiring to be connected to an electrical system of the structure so that a user may selectively customize the power source.

Figure 10A:
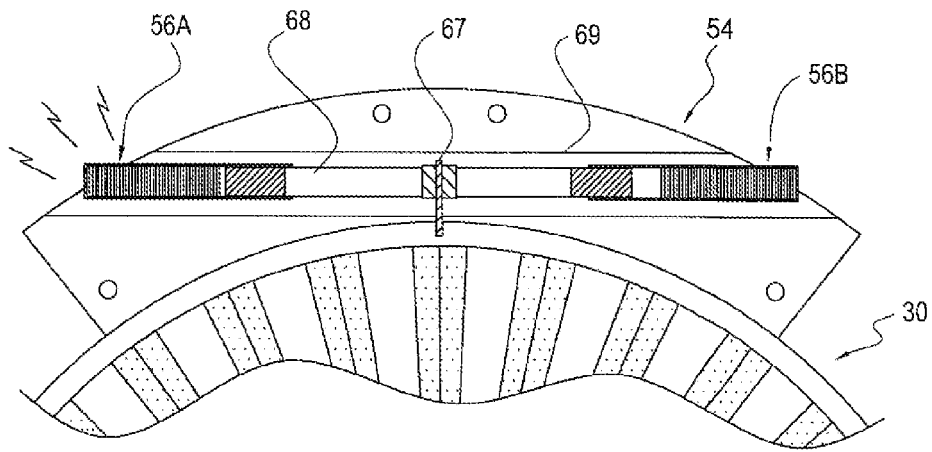
FIGS. 10A-10B are partial sectional views of the damper illustrated in FIG. 2 taken through line 10-10 and showing an actuator moving the rotor between the open position (FIG. 10A) and the closed position (FIG. 10B).
Figure 10B:
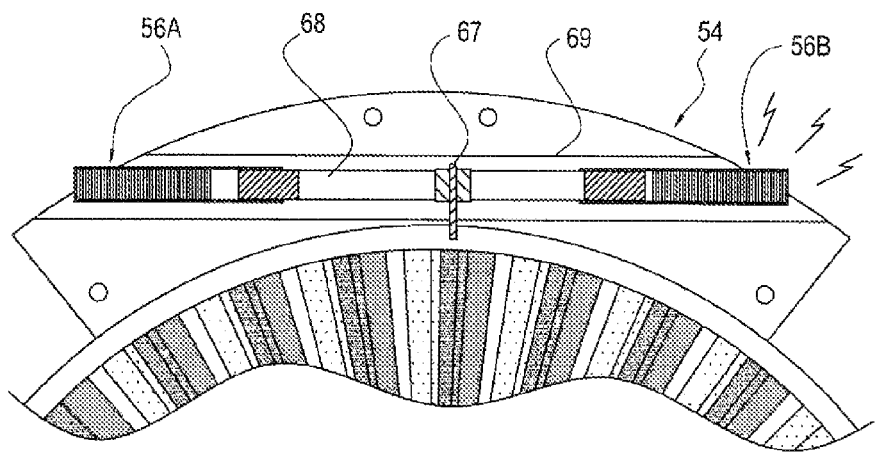

Referring now additionally to FIGS. 10A and 10B, the actuator 54 for moving the rotor 36 of the damper 30 according to the present invention is now described in greater detail. The actuator 54 may include a pair of opposing electromagnets 56. The electromagnets 56 may, for example, be provided by windings, but those skilled in the art will appreciate that the electromagnets 56 may be provided by any other form of electromagnet as well. The electromagnets 56 may be carried by an actuator tube 69 and, more particularly, at opposing ends of the actuator tube 69. The actuator may also include an actuator bar 68 having opposing ends. The opposing ends of the actuator bar preferably include metallic material that may be attracted to the opposing electromagnets 56 when the electromagnets are energized. A rotor connection member 67 may be connected to a medial portion of the actuator bar 69. The rotor connection member 67 may be connected between the actuator bar 68 and the rotor 36.

With reference to FIG. 10B, a first one of the electromagnets 56A is illustratively energized, thereby attracting the actuator bar 68 towards the electromagnet carried by an actuator tube 69. Accordingly, when the actuator bar 68 is attracted toward the first energized electromagnet 56A, the rotor connection member 67 also moves towards the energized electromagnet, thereby moving the rotor 36 connected thereto to the opened position. Referring now to FIG. 10B, the second electromagnet 56B is energized, causing the actuator bar 68 to move towards it, bringing with it the rotor connection member 67. As the rotor connection member 67 moves towards the energized electromagnet 56B illustrated in FIG. 10B, the rotor 36 is illustratively moved to the closed position.

The present invention contemplates the use of a simple, low cost universal adaptor to provide flexibility to connect the damper 30 to multiple sizes of flexible HVAG duct without the need for a variety of conicals or reducers. To implement this aspect of the invention, the ends of the damper 30 may be removable. The sides may be screwed on may be snapped on to secure them in place.

In either case, when the sides are attached to the damper 30, the sides form an airtight seal. When viewed from inside the duct, the removeably ends each have multiple indentations that may be aligned in concentric circles. These indentations allow an installer to readily "punch out" a circular area of the removeably lid that is the proper size to accommodate the flexible HVAC duct. Once the appropriately sized circle has been removed, it is necessary to create a connection flange in order to attach the flexible HVAC duct to the damper 30. The connection flange may be created from a separate piece of flexible material that is provided with the universal adaptor. The flexible material may be formed into a circle and it may also have a built in connector clip that allows it to connect securely to the removable end.

The flexible material may be separated at one of several perforations in order to create a strip of proper length for the size of the hole that has been created in the removable end. For example, for an 8 inch hole, the length of the strip required would be approximately 8π. The material is may be formed into a circle and may be connected to the removable end by attaching the connector to the removable end at the circumference of the circle that has been punched out. If desired, glue, tape or another adhesive mechanism may be used to strengthen the bond between the removable end and the newly formed connection flange. In one implementation of the universal adaptor, the connector may be replaced with any number of other attachment mechanisms. In another implementation, connection flanges of various sizes may be molded to the removable end and the installer may punch out the correct size hole and removes any flanges that are not required.

A method aspect of the present invention is for using the damper 30. The method includes moving the rotor 36 from an open position to a closed position responsive to a signal received by a controller 62 in communication with the rotor to minimize air flow through the damper 30. The method also includes moving the rotor 36 from the closed position to the opened position responsive to a signal received by a controller 62 to maximize air flow through the damper 30. Another method aspect of the present invention is for installing a damper 30 into an existing HVAC system. The method may include cutting ductwork 22 in an existing HVAC system and positioning the damper 30 so that the ductwork forms an airtight seal with the entrance side 50 and the exit side 52 of the damper 50.

An algorithm for controlling the HVAC system 20 according to the present invention is now described in greater detail. The algorithm for controlling the use of the HVAC system according to the present invention uses a variety of programmable guidelines to control the system. These include:

1. The application of control algorithms to resolve back pressure issues by monitoring back pressure and 'dumping' air into low priority microzones or unused spaces.
2. The utilization of user inputs to optimize the system for selected performance metrics such as cost reduction or increased user comfort.
3. The utilization of software algorithms to implement the user's optimization choices.
4. The use of learning algorithms so the system can customize itself for individual installation.
5. Interfacing with external sources, such as a utility company, to adjust system performance based on real time cost of electricity.

The prioritization methodology is now described in greater detail. The HVAC system 20 according to the present invention preferably uses a methodology for assigning priorities to each microzone so that algorithms are much more sophisticated than existing algorithms, i.e., majority rules methodology, and can be developed and applied.

A microzone, as used herein, is a term used to define a particular zone within the HVAC system 20 according to the present invention having any number of dampers 30 positioned therein wherein each of the dampers are tied together. This allows the dampers in a microzone to be controlled by a single personal thermostat 70. This also advantageously allows the dampers 30 in a particular microzone to be controlled together by the system controller 100. Microzone priorities can be establish based on room usage (e.g. the CEO's office vs. the janitor's closet), room occupancy (e.g. the user is present or absent from the room), or room location (e.g. east side of the building or west side). Those skilled in the art will appreciate that a large number of different priority categories can be established. The priority characteristics of each microzone can be assigned at the time of system installation or afterwards. They are stored in a database, and can be changed at any time.

Software control algorithms according to the present invention may utilize simple pressure sensors to monitor and control back pressure in the HVAC system 20 according to the present invention. When the back pressure reaches an unacceptable level, the software control algorithm may automatically opens dampers 30 that would otherwise be closed so as to increase the flow of air through the system and reduce the back pressure. The control algorithm may select the dampers 30 to open using microzone prioritization methodology. For example, if additional dampers 30 need to be opened, the control algorithm may search for microzones that are unoccupied so as to not inconvenience any users by providing conditioned air to a microzone where none was needed. Those skilled in the art will recognize that a large variety of specific algorithms can be created to apply this invention.

The HVAC system 20 according to the present invention advantageously allows user inputs to be used to influence performance metrics such as cost, comfort or control. For example, a user could provide inputs to the HVAC system 30 that causes the system to operate in a manner that allows for enhanced cost savings at the expense of decreased user comfort. In this scenario, the intelligent HVAC system might not be turned on until a large number of microzones required conditioned air. This advantageously allows the system to run for a minimal period of time, thereby reducing utility costs. Conversely, the user may select to optimize comfort at the expense of cost. In this case, inputs might be provided to the HVAC system that causes the system to respond immediately when even one microzone is outside of a desired temperature range.

Another example may entail providing inputs to the HVAC system 20 regarding levels of control. Perhaps all employees in a company that has an HVAC system 20 according to the present invention may be allowed to set their desired temperature to any level. Conversely, perhaps some employees may be limited in the temperature range they can set, and some employees may have the temperature in their microzone set by a system administrator. Those skilled in the art will recognize that there are a vast number of other performance metrics, in addition to cost, comfort and control that may be varied in an HVAC system 20 based on specific user inputs.

As noted above, it is preferable to give a customer the ability to influence the way the system behaves based on user preferences. In the HVAC system 20 according to the present invention, this may be achieved through the implementation of algorithms that adapt the control logic of the system based on user inputs. The following is a description of one implementation of such an algorithm. Those skilled in the art will appreciate that multiple other algorithms may be developed and implemented to allow users to optimize various other metrics associated with the performance of HVAC systems.

One algorithm that may be developed for an HVAC system 20 according to the present invention may allow a system's user to optimize the system's performance for either cost reduction or user comfort. A system that is optimized for comfort might run nearly constantly in order to meet the demands of a variety of users. For example, the system might turn on in cooling mode to reduce the temperature in a first office on the sunny side of the building, then quickly turn off and turn on again in heating mode to increase the temperature for the occupant of another office on the shady side of the building. In such a case, each microzone in the system may be assigned a priority rating. For example, the priority ratings may range from 1 to 5, and the CEO's office may be assigned a priority 5, while a storage closet may be assigned a priority 1. Each microzone may have a desired temperature (the 'setpoint') and the algorithm according to the present invention may keep track of the actual temperature in each microzone on a regular basis.

The smart algorithm may then calculate the difference between the setpoint and the actual temperature (the 'temperature delta'), and the time period during which this difference has occurred. The control algorithm may then calculate a 'score' for each microzone by multiplying the priority by the temperature delta and the time period. The control algorithm may also calculate a score for the entire system by adding the scores of each microzone. The owner may then select the system level score at which the intelligent HVAC system would turn on to correct the temperature deltas. If the user selected a low score, the system would turn on when a limited number of micro zones experienced a temperature delta for a limited period of time.

This configuration may likely result in a relatively high utility bill, but the building occupants may experience a high level of comfort as the system would turn on frequently to correct small temperature deltas. Conversely, a high system level score selected by the user would mean that the system did not turn on until a number of microzones were experiencing significant temperature deltas for a long period of time. Users would likely not experience the same level of comfort, but energy bills would likely be significantly lower as the HVAC system would not run nearly as frequently.

The HVAC system 20 according to the present invention may be able to adapt to its environment in an automated manner to minimize installation time, cost and effort. An example of this type of adaptation relates to the back pressure condition described above. In each installation, the system performance with respect to back pressure may vary as a result of factors such as the number of ducts, length of ducts, size of ducts, which ducts are open or closed, etc. However, for a specific system, the performance may be generally consistent over time. For example, system "A" may have back pressure issues when 30% of the ducts are closed, or when ducts 1, 3, 8, and 10, for example, are closed. Simultaneously, System B may not have back pressure issues until 45% of the ducts are closed.

The invention described herein allows a user to specify the factors that are important with respect to control of the HVAC system 20 according to the present invention, and then modify variables in the system's software control algorithm to cause the system to perform in a manner that optimizes these factors. This is achieved through the implementation of 'smart' algorithms that adapt the control logic of the system based on user inputs.

Figure 13:
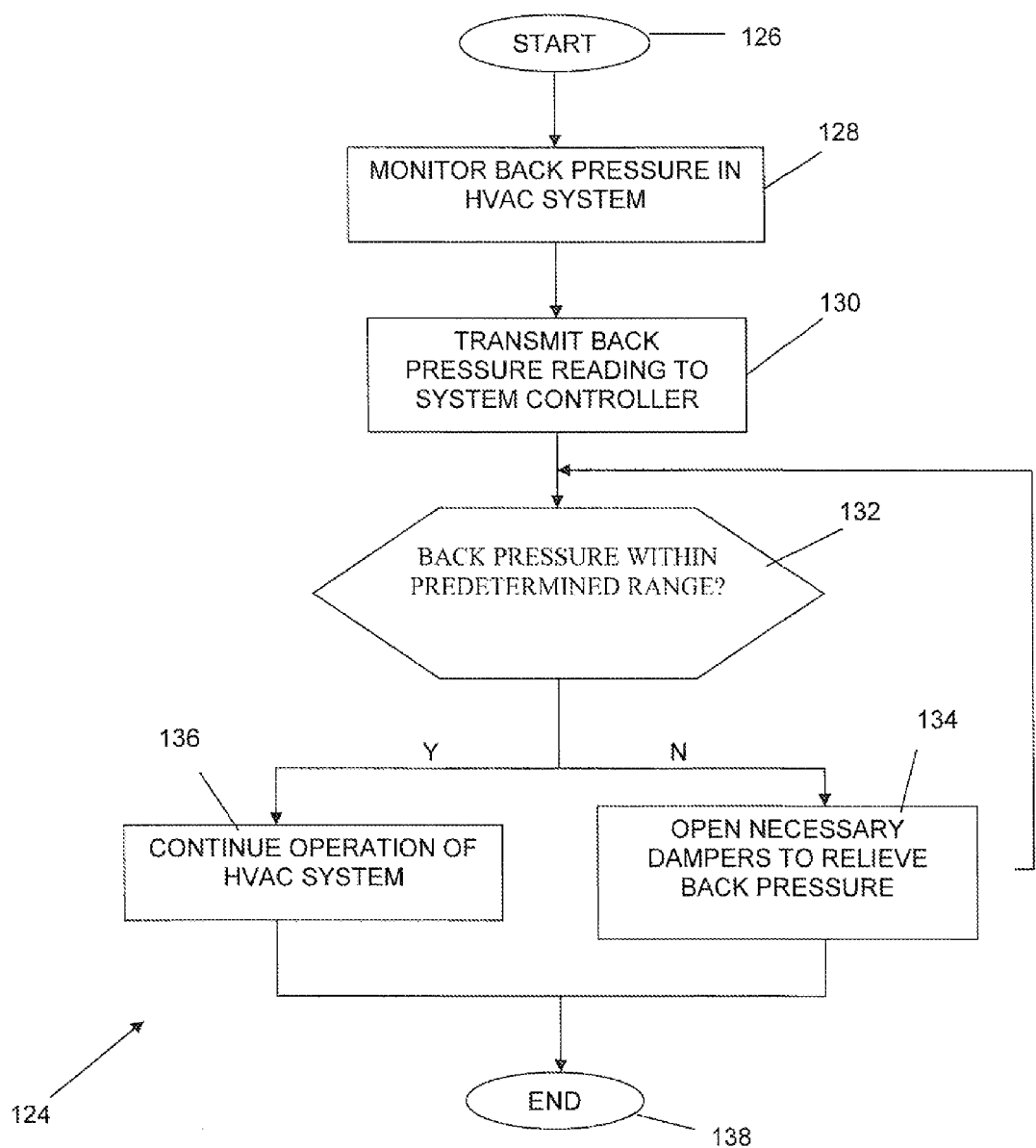
FIGS. 13-17 are flow charts illustrating operation of the HVAC system according to the present invention.

Referring now more specifically to the flow chart 124 illustrated in FIG. 13, a method for using the HVAC system 20 according to the present invention is now described in greater detail. From the start (Block 126), back pressure in the HVAC system is monitored at Block 128. At Block 130, back pressure readings are transmitted to the system controller 100. At Block 132, it is determined whether the back pressure readings received by the system controller 100 are within a predetermined range. If it is determined at Block 132 that the back pressure readings received by the system controller 100 are not within a predetermined range, then the necessary dampers 30 to relieve back pressure within the HVAC system 20 are opened at Block 134. Thereafter, it is again determined at Block 132 whether or not the back pressure readings transmitted to the system controller 100 are within the predetermined range at Block 132. If, however, it is determined at Block 132 that the back pressure readings received by the system controller 100 are within the predetermined range, then operation of the HVAC system 20 according to the present invention is continued at Block 136. Thereafter, the method is ended at Block 138.

Figure 14:
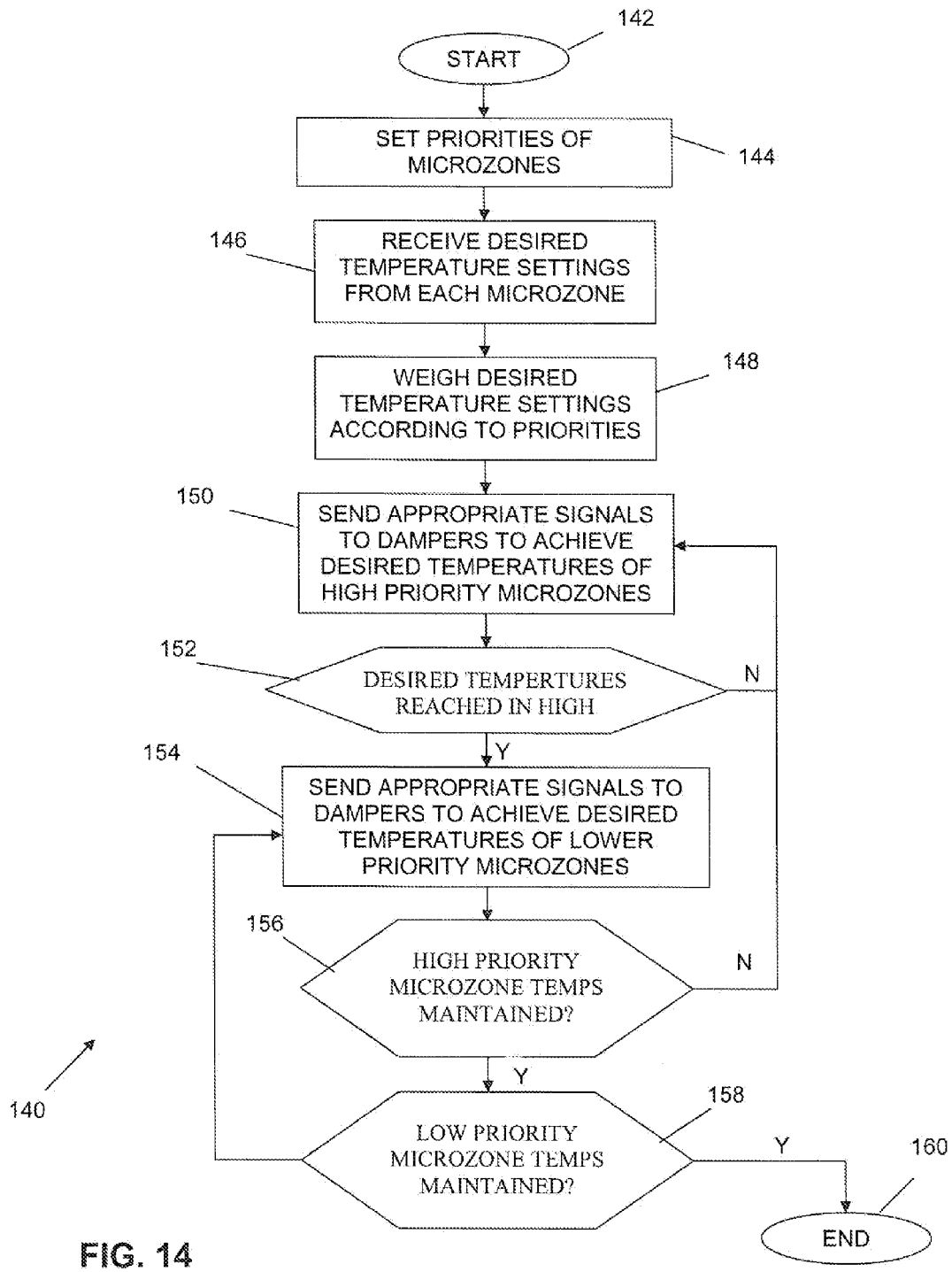

Referring now additionally to the flow chart 140 illustrated in FIG. 14, yet another method aspect of the invention is now described in greater detail. The method aspect illustrated in the flow chart 140 of FIG. 14 is also directed to use of the HVAC system 20 and, more specifically, directed to algorithms for use of the HVAC system. From the start (Block 142), priorities of microzones are set at Block 144. As described above, these priorities may be weighted based on various factors, i.e., seniority, area in building, etc. At Block 146, the system controller 100 receives desired temperature settings of each microzone. At Block 148, the desired temperature settings received by the system controller 100 are weighted according to the priorities set at Block 144.

At Block 150, the system controller may send appropriate signals to the dampers 30 of the HVAC system to achieve the desired temperatures of the higher priority microzones. Those skilled in the art will appreciate that the signals may also be sent to turn the HVAC system on and off if needed to achieve the desired temperatures. At Block 152, it is determined whether or not the desired temperatures in the higher priority microzones have been reached. If it is determined that the desired temperatures in the higher priority microzones have not been reached at Block 152, then appropriate signals are again sent at Block 150 to achieve the desired temperatures in the higher priority microzones.

If, however, it is determined at Block 152 that the desired temperatures in the higher priority microzones have been reached, then appropriate signals are sent to the dampers 30 and the HVAC system to achieve the desired temperatures in the lower priority microzones at Block 154. At Block 156, it is determined whether or not the higher priority microzones are still being maintained at their desired temperature. If it is determined at Block 156 that the higher priority microzones are not being maintained at their desired temperature, then appropriate signals are sent to the dampers 30 throughout the HVAC system to achieve the desired temperatures of the higher priority microzones at Block 150.

If, however, it is determined at Block 156 that the desired temperatures within the higher priority microzones are still being maintained at Block 156, then it is determined at Block 158 whether or not the desired temperatures of the lower priority microzones are still being maintained. If it is determined that the desired temperatures within the lower priority microzones are not being maintained at Block 158, then the appropriate signals are sent to the dampers 30 throughout the HVAC system to achieve the desired temperatures in the lower priority microzones. If, however, it is determined at Block 158 that the desired temperatures in the lower priority microzones are being achieved and the desired temperatures in the higher priority microzones are still being maintained, then the method is ended at Block 160.

Figure 15:
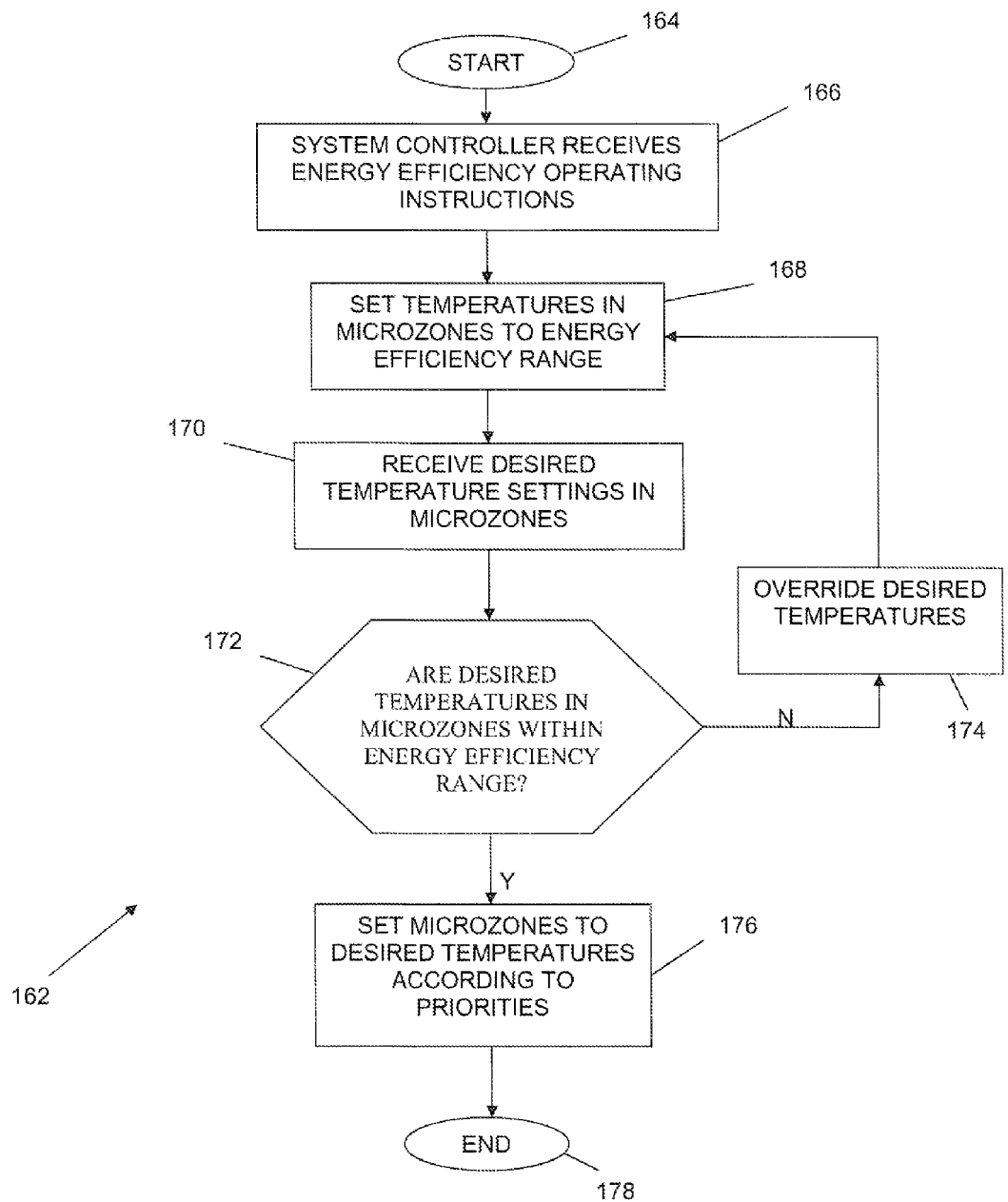

Referring now additionally to the flow chart 162 of FIG. 15, still another method aspect of the present invention is now described in greater detail. More particularly, the method illustrated in the flow chart 162 of FIG. 15 is directed to a method of using an algorithm to control the HVAC system 20 according to the present invention. From the start (Block 164), a system controller 100 receives energy efficient operating instructions at Block 166. At Block 168, the temperatures are set within the microzones to be within the energy efficiency range received in Block 166. At Block 170, the system controller 100 receives desired temperature settings from various microzones.

At Block 172, it is determined whether the desired temperatures in the microzones are within the energy efficiency range set at Block 168. If it is determined that the temperatures in the microzones are not within the energy efficiency ranges set at Block 168, then the desired temperatures of the microzones received at Block 170 are overridden at Block 174. Thereafter, the signals are again sent to the dampers 30 of the HVAC system 20 to set the temperatures in the microzones to be within the energy efficiency range at Block 168. If, however, it is determined that the temperatures within the microzones are within the energy efficiency range at Block 172, then the temperatures in the microzones are set to the desired temperatures according to priorities at Block 176 and signals are sent the open and/or close the dampers 30 in the HVAC system accordingly. Thereafter, the method is ended at Block 178.

Figure 16:
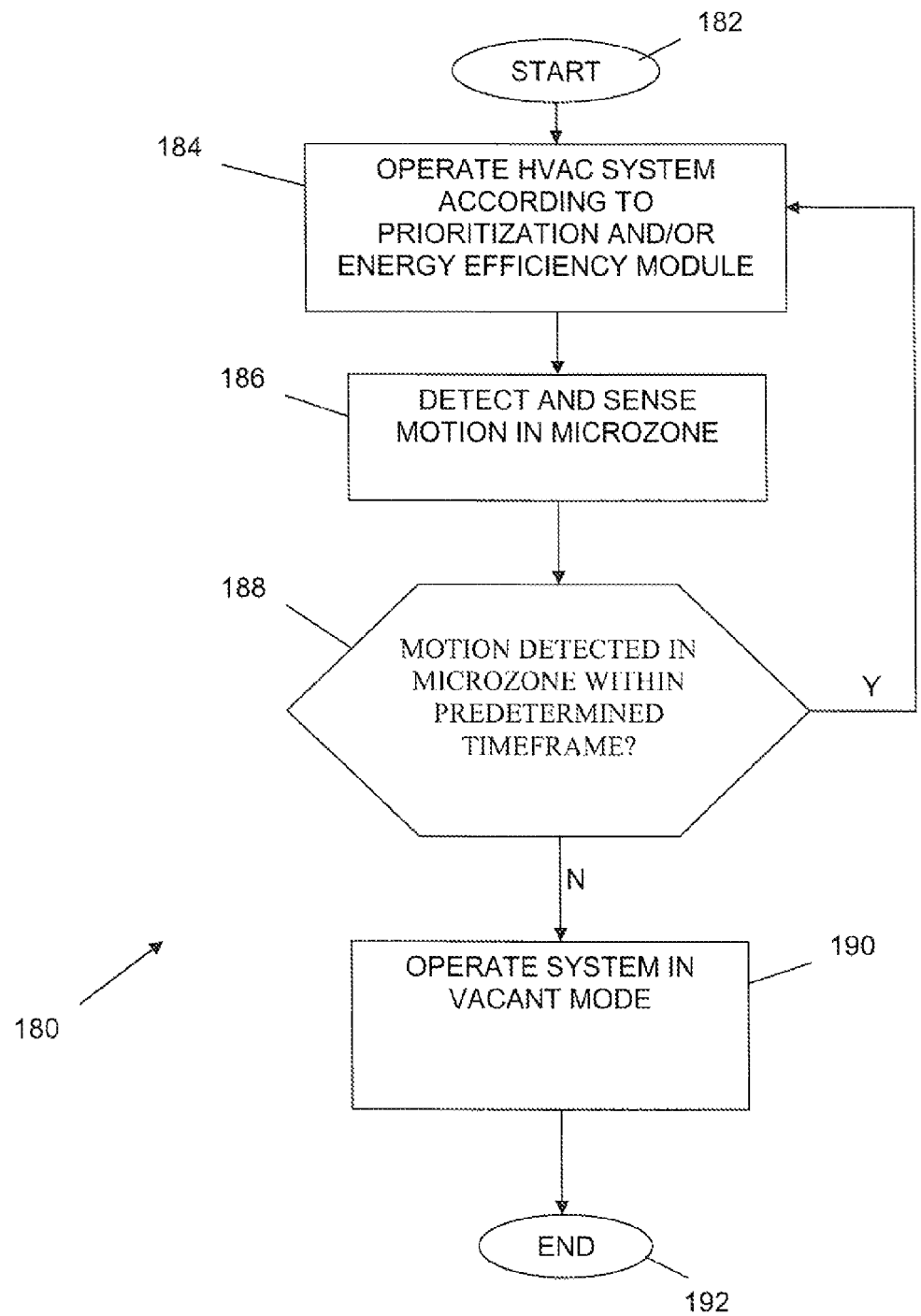

Referring now additionally to the flow chart 180 illustrated in FIG. 16, another method aspect of the present invention is now described in greater detail. The method aspect illustrated in the flow chart 180 of FIG. 16 is directed to using a motion sensor to operate the HVAC system 20 according to the present invention. From the start (Block 182), the HVAC system 20 is operated according to either the prioritization module or the energy efficiency module at Block 184. At Block 186, the system controller 100 detects and senses motion in a microzone. At Block 188, it is determined whether motion has been detected within the microzone during a predetermined time frame. If it is determined that motion has been detected within the microzone during the predetermined time frame at Block 188, then the HVAC system continues to operate at Block 184. If, however, it is determined at Block 188 that motion was not detected within the predetermined time frame, then the HVAC system 20 according to the present invention is operated in a vacant mode at Block 190. The vacant mode may, for example, include shutting the system down completely, or setting each microzone to a higher temperature to advantageously increase energy efficiency. Those skilled in the art will appreciate that the HVAC system 20 may be set to any setting as determined by the user when in the vacant mode. Thereafter, the method is ended at Block 192.

Figure 17:
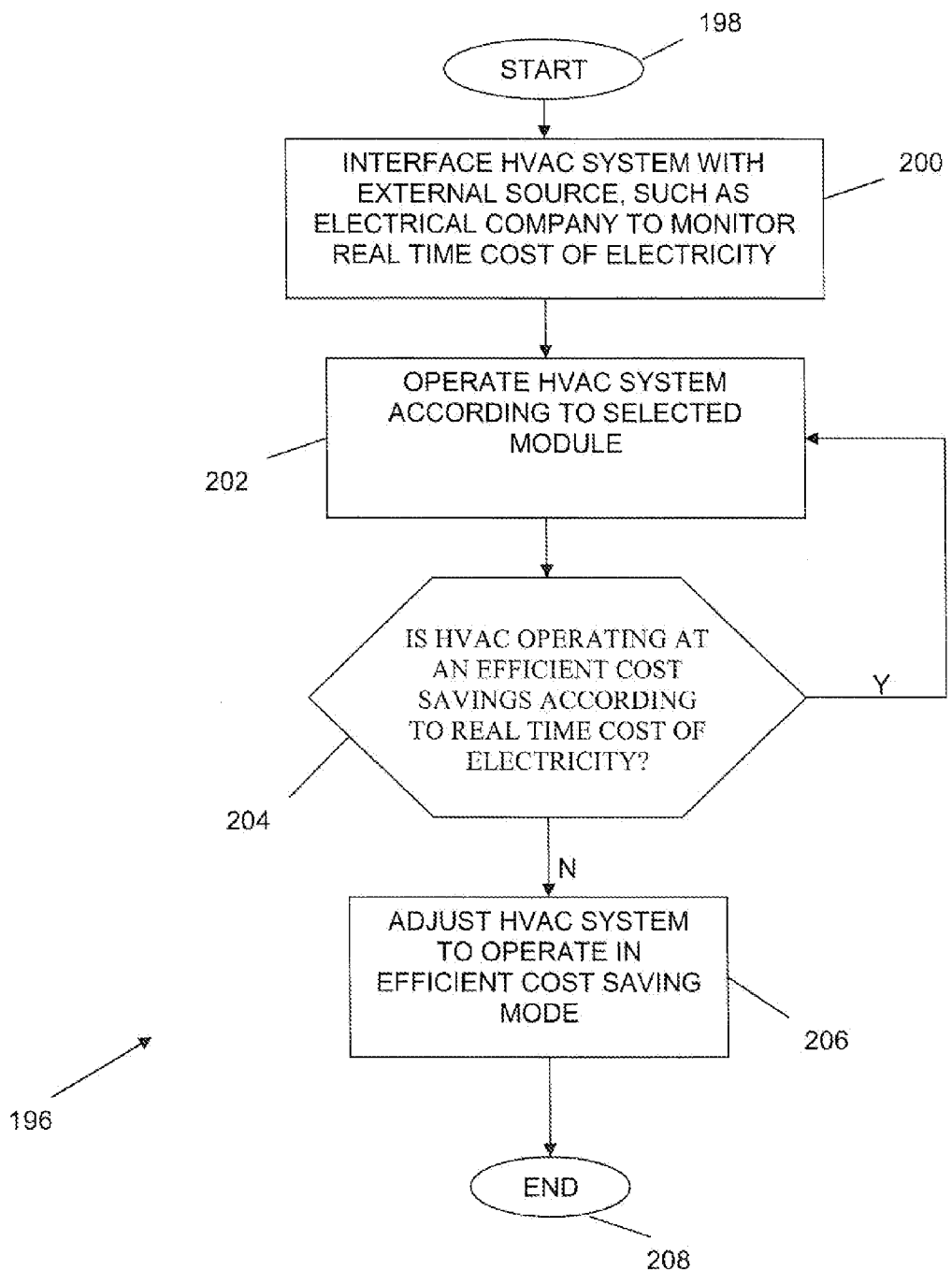

Referring now additionally to the flow chart 196 illustrated in FIG. 17, still another method aspect according to the present invention is now described in greater detail. The method aspect of the present invention illustrated in the flowchart 196 of FIG. 17 is directed to operating the HVAC system 20 according to the present invention in a mode to optimize energy cost efficiency. From the start (Block 198), the HVAC system 20 according to the present invention is interfaced with an external source at Block 200. The external source may, for example, be an electrical company, and advantageously allows the HVAC system 20 according to the present invention to monitor the cost of real time electricity.

At Block 202, the HVAC system is operated according to a selected module. Various modules of operation include comfort module, energy efficiency module, and other modules as described above. At Block 204, it is determined whether the HVAC system 20 is operating at an energy efficient cost savings according to the real time cost of electricity, as monitored at Block 200. If it is determined at Block 204 that the HVAC system 20 is operating at an energy efficient cost savings, then the HVAC system continues to operate at Block 202. If, however, it is determined at Block 204 that the HVAC system is not operating at an energy cost efficiency, then the HVAC system is adjusted to operating in an efficient cost savings mode at Block 206. The method is ended at Block 208.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A damper for a heating ventilation and air conditioning (HVAC) system comprising:
   a main body;
   a stator carried by said main body, said stator including a plurality of stator blades;
   a rotor rotatably connected to said stator and carried by said main body, said rotor including a plurality of blades moveable between an opened position and a closed position;
   wherein the shape of each of the stator blades and rotor blades, in cross section, has a substantially flat bottom and a narrowed top, so that when the rotor is in the opened position, the substantially flat bottom of each of the stator blades and rotor blades is aligned, and the narrowed top of each of stator blades and rotor blades is aligned to form a converging-diverging nozzle;
   wherein said stator and said rotor are carried by said main body so that airflow through said main body is substantially perpendicular thereto;
   wherein the opened position is defined as the at least one stator blade being aligned with the at least one rotor blade, and wherein the closed position is defined as the at least one stator blade being offset from the at least one rotor blade; and
   an actuator comprising two opposing electromagnets located at opposing ends of a stationary support structure, an actuator bar having opposing ends made of a metallic material; and
   a connection member connecting the actuator bar to the rotor such that energizing one of the electromagnets moves the actuator bar linearly and rotates the rotor.

2. A damper according to claim 1 wherein said stator is integrally formed with said main body.

3. A damper according to claim 1 wherein said main body has a substantially cylindrical shape, wherein said stator has a substantially cylindrical shape and wherein the stator blades extends from a medial portion thereof to an inner peripheral portion of said main body.

4. A damper according to claim 1 wherein said rotor has a substantially cylindrical shape and comprises a peripheral body portion, and wherein the rotor blades extend from a medial portion thereof to an inner portion of the peripheral body portion thereof.

5. A damper according to claim 1 wherein said main body has a first side defined as an entrance side and a second side opposite the first side defined as an exit side; wherein said stator is positioned adjacent the entrance side and said rotor is positioned adjacent the exit side; and wherein the airflow through said main body is directed into the entrance side of said main body, through said stator and rotor and out of the exit side of said main body.

6. A damper according to claim 1 wherein said rotor is spaced apart from said stator when the airflow travels through said main body to form an air bearing.

7. A damper according to claim 5 wherein said main body is adapted to matingly engage at least one of duct work of the HVAC system so that the entrance side engages a portion of the duct work and the exit side engages a portion of the duct work, and the duct work of the HVAC system and a diffuser of the HVAC system so that the entrance side engages the duct work and the exit side engages the diffuser.

8. A damper according to claim 1 wherein less than about 25% of airflow passes through said main body when said rotor is in the closed position.

* * * * *